United States Patent
Kaligotla

(10) Patent No.: US 12,445,488 B2
(45) Date of Patent: Oct. 14, 2025

(54) WEBPAGE PHISHING AUTO-DETECTION

(71) Applicant: Karthik Shourya Kaligotla, Frisco, TX (US)

(72) Inventor: Karthik Shourya Kaligotla, Frisco, TX (US)

( * ) Notice: Subject to any disclaimer, the term of this patent is extended or adjusted under 35 U.S.C. 154(b) by 223 days.

(21) Appl. No.: 18/309,240

(22) Filed: Apr. 28, 2023

(65) Prior Publication Data

US 2023/0344868 A1    Oct. 26, 2023

(51) Int. Cl.
*H04L 9/00* (2022.01)
*H04L 9/40* (2022.01)

(52) U.S. Cl.
CPC ...... *H04L 63/1483* (2013.01); *H04L 63/1416* (2013.01)

(58) Field of Classification Search
CPC .............. H04L 63/1483; H04L 63/1416
See application file for complete search history.

(56) References Cited

U.S. PATENT DOCUMENTS

| | | | |
|---|---|---|---|
| 8,856,937 B1 | 10/2014 | Wuest et al. | |
| 10,834,128 B1 | 11/2020 | Rajagopalan et al. | |
| 11,381,597 B2 | 7/2022 | Lancioni et al. | |
| 11,444,978 B1 | 9/2022 | Liao et al. | |
| 11,483,343 B2 | 10/2022 | Kohavi | |
| 11,570,211 B1 | 1/2023 | Liu | |
| 11,582,226 B2 | 2/2023 | Starov et al. | |
| 11,595,438 B2 | 2/2023 | Quint et al. | |
| 2015/0067839 A1 | 3/2015 | Wardman et al. | |
| 2021/0312611 A1* | 10/2021 | Neumann | G16H 50/30 |
| 2021/0344711 A1 | 11/2021 | Cleveland et al. | |
| 2022/0174092 A1* | 6/2022 | Farjon | G06F 40/221 |
| 2022/0385694 A1 | 12/2022 | Zverkov et al. | |
| 2023/0081266 A1* | 3/2023 | Crume | H04L 63/1416 726/23 |

OTHER PUBLICATIONS

Maurya, Swati, Harpreet Singh Saini, and Anurag Jain. "Browser extension based hybrid anti-phishing framework using feature selection." International Journal of Advanced Computer Science and Applications 10.11 (2019). (Year: 2019).*

* cited by examiner

*Primary Examiner* — Syed M Ahsan
(74) *Attorney, Agent, or Firm* — Raj S. Dave; Dave Law Group LLC

(57) ABSTRACT

Embodiments relate to systems and method for phishing webpage detection, the system comprising a weblink retrieval unit configured to obtain a weblink of a website of interest, a website capturing unit configured to capture a first image of the website of interest, a detection unit configured to detect a similarity between the first image of the website of interest and a list of pre-configured legitimate websites corresponding to a label in a database, an IP address grabbing unit configured to grab an IP address of the website of interest if the similarity is detected, a comparison unit configured to compare the IP address of the website of interest with a database of legitimate IP addresses in at least one of a static context and a dynamic context to identify a difference and an alarm unit configured to generate a phishing website alarm based on a presence the difference.

18 Claims, 13 Drawing Sheets

WEBPAGE PHISHING AUTO-DETECTION

FIELD

This disclosure relates to a system for prevention of phishing attacks. The disclosure is more particularly concerned with a system for a phishing detection featuring real time retrieval, analysis, and assessment of phishing webpages.

BACKGROUND

"Phishing cyber-attacks involve techniques designed to lure users into providing personal information, system credentials, and other sensitive data to unauthorized third-parties. Some of these techniques involve a third party masqueraded as a trustworthy entity through forged emails, voicemails, text messages, websites and other electronic communications directed to users. Some known defense mechanisms based on filters and/or heuristics are limited with respect to zero-day phishing attacks, high false-positive rates, low classification accuracy, among other limitations." [Source: U.S. Ser. No. 10/834,128B1 published on Oct. 11, 2020]

"Multiple approaches and systems have been developed to protect users from phishing. Many of these rely on determining whether a URL leads to a phishing page including (1) semantic analysis of the URL, (2) analysis of the webpage that the URL resolves to, and (3) statistical analysis of the URLs." [Source: U.S. Ser. No. 11/483,343B2 published on Oct. 25, 2022]

"Due to the complex nature of phishing websites, in the past only sophisticated programmers may have been able to create phishing websites. However, unsophisticated attackers may now be able to set up phishing websites by using a phishing kit. Phishing kits may be a collection of files that allow people with relatively little technical skill to create a phishing website. Phishing kits are widely available and may be purchased or even downloaded for free. With the advent of phishing kits, the number of phishing websites online at any given moment has dramatically increased. Traditional security measures have not been able to adequately protect users from these phishing attacks." [Source: U.S. Pat. No. 8,856,937B1 published on Oct. 17, 2014]

"[T]he syntactical fingerprinting method is used to find file relationships and determine file similarity. It does so by parsing files and large sets of strings into segments and comparing those segments to other files or documents to determine their similarity. The ability of syntactical fingerprinting to identify phishing website relies in part on the practice of software developers reusing structural and functional components, such as functions and classes, in the development of their programs or websites." [Source: US20150067839A1 published on Mar. 5, 2015]

"A method of detecting a phishing event comprises acquiring an image of visual content rendered in association with a source and determining that the visual content includes a password prompt. The method comprises performing an object detection, using an object detection convolutional network, on a brand logo in the visual content, to detect one or more targeted brands. Spatial analysis of the visual content may be performed to identify one or more solicitations of personally identifiable information." [Source: US20210344711A1 published on Nov. 4, 2021]

"[T]he methods and systems described herein are directed to analyzing the content obtained after the browser has performed certain steps to convert HTML, CSS, and JavaScript into a visual image, but not the coded data. The present methods and systems therefore allow decreasing the frequency of false responses in identifying phishing web resources." [Source: US20220385694A1 published on Dec. 1, 2022]

It would be advantageous to have a phishing detection and protection system that uses improved analysis methods to overcome the evasiveness of current phishing sites. It would further be useful for the phishing analysis system to retrieve the suspect webpage using the IP address of the recipient to ensure correct resolution.

As a result, traditional methods for detecting phishing attacks, such as blacklisting known phishing URLs or using static rules to flag suspicious emails, are becoming less effective. To combat this evolving threat, there is a need for better systems for phishing detection. Investing in better phishing detection systems is critical to staying ahead of the evolving threat landscape and protecting against these types of attacks.

SUMMARY

The systems and methods described herein employ advanced technologies such as machine learning, natural language processing, and behavioral analysis to identify and flag suspicious emails and websites. By constantly learning and adapting to new threats, these systems are better equipped to detect phishing attacks and protect individuals and organizations from potential harm.

An embodiment relates to a system for automatic phishing website detection. The system comprising a weblink retrieval unit configured to obtain a weblink of a website of interest, a website capturing unit configured to capture a first image of the website of interest, a detection unit configured to detect a similarity between the first image of the website of interest and a list of pre-configured legitimate websites corresponding to a label in a database, an IP address grabbing unit configured to grab an IP address of the website of interest if the similarity is detected, a comparison unit configured to compare the IP address of the website of interest with a database of legitimate IP addresses in at least one of a static context and a dynamic context to identify a difference, and an alarm unit configured to generate a phishing website alarm based on a presence of the difference.

In an embodiment, the system further comprises an information unit configured to send information comprising the first image and the first IP address about a known phishing website to at least one of a domain owner and a repository on an as-needed basis.

In another embodiment, the system further comprises a collection unit to store details and information related to the known phishing websites and legitimate websites.

In yet another embodiment, the system further comprises an automated web scraping configured to collect a list of legitimate URLs corresponding to the legitimate website.

In yet another embodiment, the weblink retrieval unit prompts a command to enter the weblink of the website of interest.

In yet another embodiment, the website capturing unit comprises web crawlers to capture the first image of the website of interest.

In yet another embodiment, the website capturing unit is configured to convert an HTML file to the first image.

In yet another embodiment, the detection unit utilizes computer vision to detect the similarity between the first image of the website of interest and the list of pre-configured legitimate websites.

In yet another embodiment, the computer vision comprises an artificial intelligence model.

In yet another embodiment, the artificial intelligence model comprises a machine learning algorithm.

In yet another embodiment, the machine learning algorithm is configured to train the artificial intelligence model.

In yet another embodiment, the machine learning algorithm is a neural network model.

In yet another embodiment, the neural network model is a convolutional neural network model.

In yet another embodiment, the machine learning module is configured to train based on at least one of an evolutionary algorithm and a reinforcement learning based algorithm.

In yet another embodiment, the machine learning module is configured to train the detection unit and the comparison unit of the system.

In yet another embodiment, the system is further configured to retrieve a first digital certificate of the website of interest and compare the first digital certificate of the website of interest with a digital certificate of the legitimate website that the first image was classified into, via the comparison unit, to identify a second difference.

An embodiment relates to a method for automatic phishing website detection. The method comprises obtaining a weblink of a website of interest, capturing a first image of the website of interest, detecting a similarity between the first image of the website of interest and a second image of a legitimate website, grabbing a first IP address of the website of interest if the similarity is detected, comparing the first IP address of website of interest with a second IP address of the legitimate website to detect a difference, and generating a phishing website alarm based on a presence of the difference.

In an embodiment, the weblink of the website of interest is obtained via a user interface.

In another embodiment, retrieving the first image of the website can be done using at least one of network scanning, capturing a Document Object Model (DOM) of the website of interest utilizing a web scraper and creating an image with the captured Document Object model, and a mechanism in which rendering and screenshotting the website of interest takes place.

In yet another embodiment, comparing the first IP addresses with the second IP address is done using at least one of an exact match algorithm, subnet match algorithm, geolocation match algorithm and behavior-based match algorithm.

In yet another embodiment, the similarity between the first image of the website of interest and the second image of the legitimate website is detected using a machine learning model.

In yet another embodiment, the machine learning model is pre-trained.

In yet another embodiment, the machine learning model comprises at least one of a deep learning neural network model and a shallow learning artificial intelligence model.

In yet another embodiment, the method further comprises maintaining and updating an image database comprising a series of first images, second images and augmented images and associated labels of the website of interest.

In yet another embodiment, the image database is used to update the machine learning model based on the similarities of the images compared to the website of interest.

In yet another embodiment, the method further comprises expanding dataset in the image database through image augmentation.

In yet another embodiment, the method further comprises periodically training the machine learning model, with the image database that is maintained through automated software features.

In yet another embodiment, the machine learning model is utilized in a workflow of an application.

In yet another embodiment, the machine learning model utilizes a classification algorithm for detecting similarity between the website in question and one of many legitimate websites that are stored in the database.

In yet another embodiment, the application resides on a browser as an add-on extension.

In yet another embodiment, the image database comprises extensible database functionality to save a procured new image from a global phishing incident and one or more global databases.

In yet another embodiment, an output of the detecting, determining, and comparing after validation is feedback to the machine learning model for re-training and updating.

In yet another embodiment, the method further comprises retrieving a first digital certificate of the website of interest, and comparing the first digital certificate of the website of interest with a digital certificate of the legitimate website that the first image was classified into, to identify a second difference.

In yet another embodiment, the first IP address is a public IP address.

An embodiment relates to a non-transitory computer-readable storage medium for automatic phishing website detection. The non-transitory computer-readable storage medium, storing executable instructions, when executed by a processor, causing the processor to implement a machine learning (ML)-based phishing protection method, the method comprising obtaining a weblink of a website of interest, capturing a first image of the website of interest, detecting a similarity between the first image of the website of interest and a second image of a legitimate website, grabbing a first IP address of the website of interest if the similarity is detected, and comparing the first IP address of the website of interest with a second IP address of the legitimate website to detect a difference.

An embodiment relates to a system for automatic phishing website detection. The system comprising a weblink retrieval unit configured to obtain a weblink of a website of interest, a website capturing unit configured to capture a first image of the website of interest, a detection unit configured to detect a similarity between the first image of the website of interest and a list of pre-configured legitimate websites corresponding to a label in a database, a digital certificate capture unit configured to grab a first digital certificate of the website of interest if the similarity is detected, a comparison unit configured to compare the first digital certificate of the website of interest with second digital certificate of the legitimate website in at least one of a static context and a dynamic context to identify a difference, and an alarm unit configured to generate a phishing website alarm based on a presence of the difference.

An embodiment relates to a method for automatic phishing website detection. The method comprises obtaining a weblink of a website of interest, capturing a first image of the website of interest, detecting a similarity between the first image of the website of interest and a list of pre-configured legitimate websites corresponding to a label in a database, grabbing a first digital certificate of the website of interest if the similarity is detected, comparing the first digital certificate of the website of interest with second digital certificate of the legitimate website in at least one of a static context and a dynamic context to identify a difference, and generating a phishing website alarm based on a presence of the difference.

An embodiment relates to a system for automatic phishing website detection. The system comprising a weblink retrieval unit configured to obtain a weblink of a website of interest, a website capturing unit configured to capture a first image of the website of interest, a detection unit configured to detect similarity between the first image of the website of interest and a list of pre-configured legitimate websites corresponding to a label in a database, an IP address grabbing unit configured to grab an IP address of the website of interest when the similarity is found, a comparison unit configured to compare the IP address of the website of interest with a database of legitimate IP addresses in either a static context and a dynamic context to identify a first difference, and a digital certificate grabbing unit configured to grab a first digital certificate of the website of interest when a similarity is found, a digital certificate comparison unit configured to compare the first digital certificate of the website of interest with a database of legitimate digital certificates to identify a second difference, and an alarm unit configured to generate a phishing website alarm based on a presence of at least one of the first difference and the second difference.

In an embodiment, the system further comprises an information unit configured to send information about a known phishing website to at least one of a domain owner and a repository on an as-needed basis.

In another embodiment, the system further comprises a collection unit to store details and information related to known phishing websites and legitimate websites.

In yet another embodiment, the system further comprises an automated web scraping configured to collect a list of legitimate URLs corresponding to the legitimate website.

An embodiment relates to a method for automatic phishing website detection. The method comprising obtaining a weblink of a website of interest, capturing a first image of the website of interest, detecting similarity between the first image of the website of interest and a list of pre-configured legitimate websites corresponding to a label in a database, grabbing an IP address of the website of interest when a similarity is found, comparing the IP address of the website of interest with a database of legitimate IP addresses in at least one of a static context and a dynamic context to identify a first difference, grabbing a first digital certificate of the website of interest when the similarity is found, comparing the first digital certificate of the website of interest with a database of legitimate digital certificates to identify a second difference, and generating a phishing website alarm based on a presence of at least one of the first difference and the second difference.

An embodiment relates to a non-transitory computer-readable storage medium for automatic phishing website detection. The non-transitory computer-readable storage medium, storing executable instructions, when executed by a processor, causing the processor to implement a machine learning (ML)-based phishing protection method, the method comprising obtaining a weblink of a website of interest, capturing a first image of the website of interest, detecting similarity between the first image of the website of interest and a list of pre-configured legitimate websites corresponding to a label in a database, grabbing an IP address of the website of interest when a similarity is found, comparing the IP address of the website of interest with a database of legitimate IP addresses in at least one of a static context and a dynamic context to identify a first difference, grabbing a first digital certificate of the website of interest when the similarity is found, comparing the first digital certificate of the website of interest with a database of legitimate digital certificates to identify a second difference, and generating a phishing website alarm based on a presence of at least one of the first difference and the second difference.

An embodiment relates to a method for automatic phishing website detection. The method comprising obtaining a weblink of a website of interest, capturing a first image of the website of interest, detecting similarity percentage between the first image of the website of interest and a list of pre-configured legitimate websites corresponding to a label in a database, detecting a difference between the first image of the website of interest and a second image of legitimate websites when the similarity percentage is above a predefined threshold, and generating a phishing website alarm based on a presence of the difference.

In an embodiment, the predefined threshold is in a range of 85% to 99.9%.

In another embodiment, the predefined threshold is in a range of 90% to 99.9%.

In yet another embodiment, the predefined threshold is in a range of 95% to 99.9%.

In yet another embodiment, the predefined threshold is in a range of 98% to 99.9%.

In yet another embodiment, the predefined threshold is in a range of 99% to 99.9%.

An embodiment relates to a method for automatic phishing website detection. The method comprises collecting image dataset for phishing website and legitimate websites from at least one of a data feed and data sources, clustering of the image dataset using visual similarity tool, automatically labeling of an image of the image dataset to create a labeled dataset, linking the labeled dataset with a screenshot of the image, extracting image features of the image using a pre-trained convolutional neural network model, training a fully connected layer of the pre-trained convolutional neural network model to classify a custom image dataset to obtain a re-trained convolutional neural network model, and detecting a phishing website using the re-trained convolutional neural network model.

BRIEF DESCRIPTION OF THE FIGURES

These and other aspects of the present disclosure will now be described in more detail, with reference to the appended drawings showing exemplary embodiments of the present disclosure, in which.

DETAILED DESCRIPTION

Definitions and General Techniques

Figure 1:
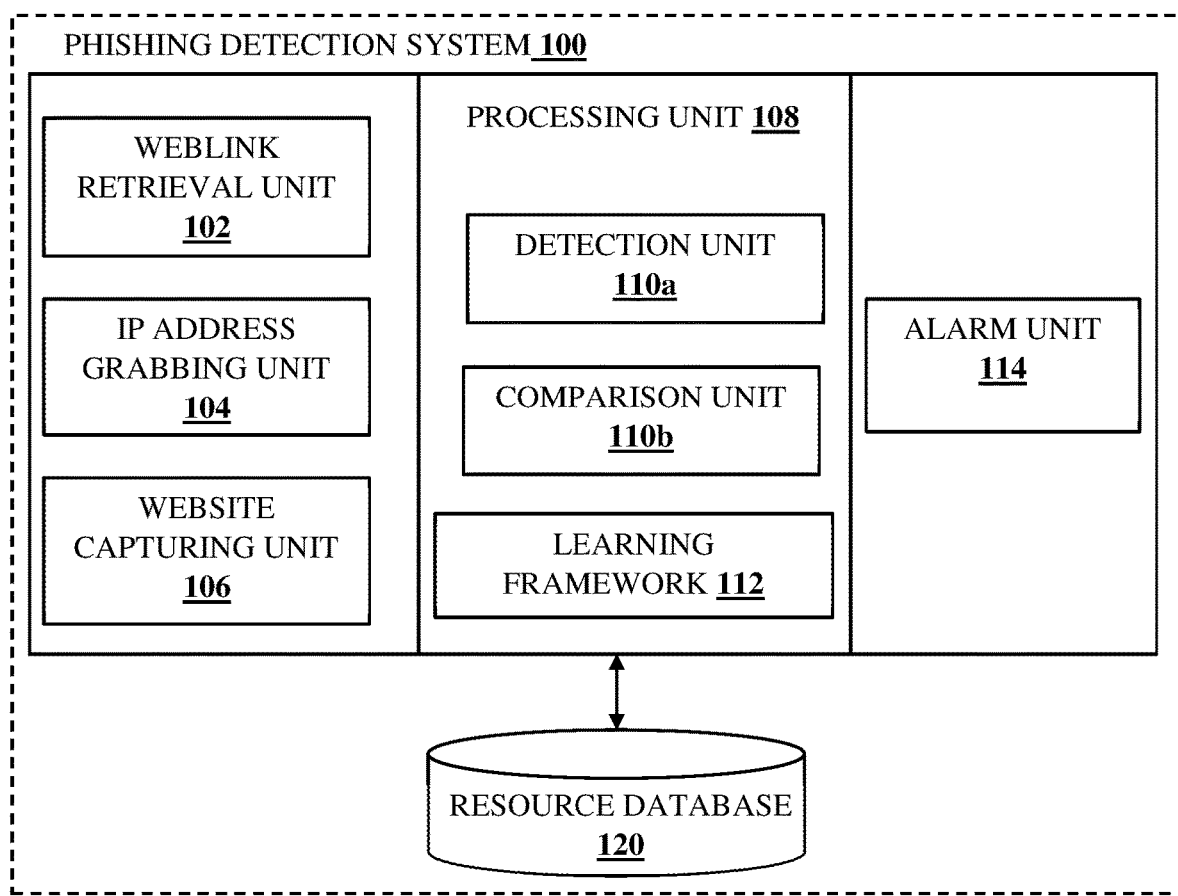
FIG. 1 shows a schematic diagram of a phishing detection system, according to at least some embodiments of the present disclosure.

For simplicity and clarity of illustration, the figures illustrate the general manner of construction. The description and figures may omit the descriptions and details of well-known features and techniques to avoid unnecessarily obscuring the present disclosure. The figures exaggerate the dimensions of some of the elements relative to other elements to help improve understanding of embodiments of the present disclosure. The same reference numeral in different figures denotes the same element.

Although the herein detailed description contains many specifics for the purpose of illustration, a person of ordinary skill in the art will appreciate that many variations and alterations to the details are considered to be included herein.

Accordingly, the embodiments herein are without any loss of generality to, and without imposing limitations upon, any claims set forth. The terminology used herein is for the purpose of describing particular embodiments only and is not limiting. Unless defined otherwise, all technical and scientific terms used herein have the same meaning as commonly understood by one with ordinary skill in the art to which this disclosure belongs.

As used herein, the articles "a" and "an" used herein refer to one or to more than one (i.e., to at least one) of the grammatical object of the article. By way of example, "an element" means one element or more than one element. Moreover, usage of articles "a" and "an" in the subject specification and annexed drawings construe to mean "one or more" unless specified otherwise or clear from context to mean a singular form.

As used herein, the terms "example" and/or "exemplary" mean serving as an example, instance, or illustration. For the avoidance of doubt, such examples do not limit the herein described subject matter. In addition, any aspect or design described herein as an "example" and/or "exemplary" is not necessarily preferred or advantageous over other aspects or designs, nor does it preclude equivalent exemplary structures and techniques known to those of ordinary skill in the art.

As used herein, the terms "first," "second," "third," and the like in the description and in the claims, if any, distinguish between similar elements and do not necessarily describe a particular sequence or chronological order. The terms are interchangeable under appropriate circumstances such that the embodiments herein are, for example, capable of operation in sequences other than those illustrated or otherwise described herein. Furthermore, the terms "include," "have," and any variations thereof, cover a non-exclusive inclusion such that a process, method, system, article, device, or apparatus that comprises a list of elements is not necessarily limiting to those elements, but may include other elements not expressly listed or inherent to such process, method, system, article, device, or apparatus.

As used herein, the terms "left," "right," "front," "back," "top," "bottom," "over," "under" and the like in the description and in the claims, if any, are for descriptive purposes and not necessarily for describing permanent relative positions. The terms so used are interchangeable under appropriate circumstances such that the embodiments of the apparatus, methods, and/or articles of manufacture described herein are, for example, capable of operation in other orientations than those illustrated or otherwise described herein.

No element act, or instruction used herein is critical or essential unless explicitly described as such. Furthermore, the term "set" includes items (e.g., related items, unrelated items, a combination of related items and unrelated items, etc.) and may be interchangeable with "one or more". Where only one item is intended, the term "one" or similar language is used. Also, the terms "has," "have," "having," or the like are open-ended terms. Further, the phrase "based on" means "based, at least in part, on" unless explicitly stated otherwise.

As used herein, the terms "system," "device," "unit," and/or "module" refer to a different component, component portion, or component of the various levels of the order. However, other expressions that achieve the same purpose may replace the terms.

As used herein, the terms "couple," "coupled," "couples," "coupling," and the like refer to connecting two or more elements mechanically, electrically, and/or otherwise. Two or more electrical elements may be electrically coupled together, but not mechanically or otherwise coupled together. Coupling may be for any length of time, e.g., permanent, or semi-permanent or only for an instant. "Electrical coupling" includes electrical coupling of all types. The absence of the word "removably," "removable," and the like, near the word "coupled" and the like does not mean that the coupling, etc. in question is or is not removable.

As used herein, the term "or" means an inclusive "or" rather than an exclusive "or." That is, unless specified otherwise, or clear from context, "X employs A or B" means any of the natural inclusive permutations. That is, if X employs A; X employs B; or X employs both A and B, then "X employs A or B" is satisfied under any of the foregoing instances.

As used herein, two or more elements or modules are "integral" or "integrated" if they operate functionally together. Two or more elements are "non-integral" if each element can operate functionally independently.

As used herein, the term "real-time" refers to operations conducted as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As used herein, the term "approximately" can mean within a specified or unspecified range of the specified or unspecified stated value. In some embodiments, "approximately" can mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As used herein, the term "substantially" or the word "roughly" or the word "about" is used to qualify (in particular) numerical quantities to indicate that small variations from the specified value are envisaged.

Other specific forms may embody the present disclosure without departing from its spirit or characteristics. The described embodiments are in all respects illustrative and not restrictive. Therefore, the appended claims rather than the description herein indicate the scope of the disclosure. All variations which come within the meaning and range of equivalency of the claims are within their scope.

The actual specialized control hardware or software code used to implement these systems and/or methods is not limiting to the implementations. Thus, any software and any hardware can implement the systems and/or methods based on the description herein without reference to specific software code.

A computer program (also known as a program, software, software application, script, or code) is written in any appropriate form of programming language, including compiled or interpreted languages. Any appropriate form, including a standalone program or a module, component, subroutine, or other unit suitable for use in a computing environment may deploy it. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may execute on one computer or on multiple computers that are located at one site or distributed across multiple sites and interconnected by a communication network.

One or more programmable processors, executing one or more computer programs to perform functions by operating on input data and generating output, perform the processes and logic flows described in this specification. The processes and logic flows may also be performed by, and apparatus may also be implemented as, special purpose logic circuitry, for example, without limitation, a Field Programmable Gate Array (FPGA), an Application Specific Integrated Circuit (ASIC), Application Specific Standard Products (ASSPs), System-On-a-Chip (SOC) systems, Complex Programmable Logic Devices (CPLDs), etc.

Processors suitable for the execution of a computer program include, by way of example, both general and special purpose microprocessors, and any one or more processors of any appropriate kind of a digital computer. A processor will receive instructions and data from a read-only memory or a random-access memory or both. Elements of a computer can include a processor for performing instructions and one or more memory devices for storing instructions and data. A computer will also include, or is operatively coupled to receive data, transfer data or both, to/from one or more mass storage devices for storing data e.g., magnetic disks, magneto optical disks, optical disks, or solid-state disks. However, a computer need not have such devices. Moreover, another device, e.g., a mobile telephone, a personal digital assistant (PDA), a mobile audio player, a Global Positioning System (GPS) receiver, etc. may embed a computer. Computer-readable media suitable for storing computer program instructions and data include all forms of non-volatile memory, media and memory devices, including, by way of example, semiconductor memory devices (e.g., Erasable Programmable Read-Only Memory (EPROM), Electronically Erasable Programmable Read-Only Memory (EEPROM), and flash memory devices), magnetic disks (e.g., internal hard disks or removable disks), magneto optical disks (e.g. Compact Disc Read-Only Memory (CD ROM) disks, Digital Versatile Disk-Read-Only Memory (DVD-ROM) disks) and solid-state disks. Special purpose logic circuitry may supplement or incorporate the processor and the memory.

To provide for interaction with a user, a computer may have a display device, e.g., a Cathode Ray Tube (CRT) or Liquid Crystal Display (LCD) monitor, for displaying information to the user, and a keyboard and a pointing device, e.g., a mouse or a trackball, by which the user may provide input to the computer. Other kinds of devices provide for interaction with a user as well. For example, feedback to the user may be any appropriate form of sensory feedback, e.g., visual feedback, auditory feedback, or tactile feedback; and a computer may receive input from the user in any appropriate form, including acoustic, speech, or tactile input.

A computing system that includes a back-end component, e.g., a data server, or that includes a middleware component, e.g., an application server, or that includes a front-end component, e.g., a client computer having a graphical user interface or a Web browser through which a user may interact with an implementation, or any appropriate combination of one or more such back-end, middleware, or front-end components, may realize implementations described herein. Any appropriate form or medium of digital data communication, e.g., a communication network may interconnect the components of the system. Examples of communication networks include a Local Area Network (LAN) and a Wide Area Network (WAN), e.g., Intranet and Internet.

The computing system may include clients and servers. A client and server are remote from each other and typically interact through a communication network. The relationship of the client and server arises by virtue of computer programs running on the respective computers and having a client-server relationship to each other.

Embodiments of the present disclosure may comprise or utilize a special purpose or general purpose computer including computer hardware. Embodiments within the scope of the present disclosure may also include physical and other computer-readable media for carrying or storing computer-executable instructions and/or data structures. Such computer-readable media can be any media accessible by a general purpose or special purpose computer system. Computer-readable media that store computer-executable instructions are physical storage media. Computer-readable media that carry computer-executable instructions are transmission media. Thus, by way of example and not limitation, embodiments can comprise at least two distinct kinds of computer-readable media: physical computer-readable storage media and transmission computer-readable media.

Although the present embodiments described herein are with reference to specific example embodiments it will be evident that various modifications and changes may be made to these embodiments without departing from the broader spirit and scope of the various embodiments. For example, hardware circuitry (e.g., Complementary Metal Oxide Semiconductor (CMOS) based logic circuitry), firmware, software (e.g., embodied in a non-transitory machine-readable medium), or any combination of hardware, firmware, and software may enable and operate the various devices, units, and modules described herein. For example, transistors, logic gates, and electrical circuits (e.g., Application Specific Integrated Circuit (ASIC) and/or Digital Signal Processor (DSP) circuit) may embody the various electrical structures and methods.

In addition, a non-transitory machine-readable medium and/or a system may embody the various operations, processes, and methods disclosed herein. Accordingly, the specification and drawings are illustrative rather than restrictive.

Physical computer-readable storage media includes RAM, ROM, EEPROM, CD-ROM or other optical disk storage (such as CDs, DVDs, etc.), magnetic disk storage or other magnetic storage devices, solid-state disks or any other medium. They store desired program code in the form of computer-executable instructions or data structures which can be accessed by a general purpose or special purpose computer.

As used herein, the term "network" refers to one or more data links that enable the transport of electronic data between computer systems and/or modules and/or other electronic devices. When a network or another communications connection (either hardwired, wireless, or a combination of hardwired or wireless) transfers or provides information to a computer, the computer properly views the connection as a transmission medium. A general purpose or special purpose computer access transmission media that can include a network and/or data links which carry desired program code in the form of computer-executable instructions or data structures. The scope of computer-readable media includes combinations of the above, that enable the transport of electronic data between computer systems and/or modules and/or other electronic devices.

Further, upon reaching various computer system components, program code in the form of computer-executable instructions or data structures can be transferred automatically from transmission computer-readable media to physical computer-readable storage media (or vice versa). For example, computer-executable instructions or data structures received over a network or data link can be buffered in RAM within a Network Interface Module (NIC), and then eventually transferred to computer system RAM and/or to less volatile computer-readable physical storage media at a computer system. Thus, computer system components that also (or even primarily) utilize transmission media may include computer-readable physical storage media.

Computer-executable instructions comprise, for example, instructions and data which cause a general purpose computer, special purpose computer, or special purpose processing device to perform a certain function or group of functions. The computer-executable instructions may be, for example, binary, intermediate format instructions such as assembly language, or even source code. Although the subject matter herein described is in a language specific to structural features and/or methodological acts, the described features or acts described do not limit the subject matter defined in the claims. Rather, the herein described features and acts are example forms of implementing the claims.

While this specification contains many specifics, these do not construe as limitations on the scope of the disclosure or of the claims, but as descriptions of features specific to particular implementations. A single implementation may implement certain features described in this specification in the context of separate implementations. Conversely, multiple implementations separately or in any suitable sub-combination may implement various features described herein in the context of a single implementation. Moreover, although features described herein as acting in certain combinations and even initially claimed as such, one or more features from a claimed combination may in some cases be excised from the combination, and the claimed combination may be directed to a sub-combination or variation of a sub-combination.

Similarly, while operations depicted herein in the drawings in a particular order to achieve desired results, this should not be understood as requiring that such operations be performed in the particular order shown or in sequential order or that all illustrated operations be performed, to achieve desirable results. In certain circumstances, multi-tasking and parallel processing may be advantageous. Moreover, the separation of various system components in the implementations should not be understood as requiring such separation in all implementations, and it should be understood that the described program components and systems may be integrated together in a single software product or packaged into multiple software products.

Even though particular combinations of features are recited in the claims and/or disclosed in the specification, these combinations are not intended to limit the disclosure of possible implementations. Other implementations are within the scope of the claims. For example, the actions recited in the claims may be performed in a different order and still achieve desirable results. In fact, many of these features may be combined in ways not specifically recited in the claims and/or disclosed in the specification. Although each dependent claim may directly depend on only one claim, the disclosure of possible implementations includes each dependent claim in combination with every other claim in the claim set.

Further, a computer system including one or more processors and computer-readable media such as computer memory may practice the methods. In particular, one or more processors execute computer-executable instructions, stored in the computer memory, to perform various functions such as the acts recited in the embodiments.

Those skilled in the art will appreciate that the invention may be practiced in network computing environments with many types of computer system configurations including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, etc. Distributed system environments where local and remote computer systems, which are linked (either by hardwired data links, wireless data links, or by a combination of hardwired and wireless data links) through a network, both perform tasks may also practice the invention. In a distributed system environment, program modules may be located in both local and remote memory storage devices.

The following terms and phrases, unless otherwise indicated, shall be understood to have the following meanings.

The term "website of interest" refers to a user defined or selected website that a user is interested in and wants access only to a legitimate website and not its counter phishing website.

The term "phishing website" refers to a fraudulent website that is designed to mimic a legitimate website to trick users into disclosing sensitive information such as passwords, credit card numbers, and personal identification information.

The term "IP address" is a short form of Internet Protocol address and refers to a numerical label assigned to each device connected to a computer network that uses the Internet Protocol address for communication.

The term "legitimate website" as used herein refers to a website that is legal, legitimate, and operates within the bounds of acceptable online behavior. It is typically operated by a legitimate business or organization and provides accurate, reliable, legitimate information or services to users.

The term "label" as used herein refers to a tag or marker that can be used to identify, classify, or categorize a legitimate website.

The term "legitimate IP addresses" as used herein refers to IP addresses that are authorized and allocated to legitimate entities by an internet registry. These IP addresses are not associated with spam, malware, or other malicious activity.

The term "digital certificate" refers to a digital password/document that verifies the identity of an entity or website and provides secure communication by encrypting data exchanged between the user and the website.

The phrase "phishing website alarm" as used herein refers to a warning or alert mechanism that notifies users when they encounter a website that is suspected of phishing or other malicious activity.

The term "automated web scraping" refers to a process of extracting data from websites automatically using software tools or bots.

The term "URLs" or "Uniform Resource Locators" refer to the unique addresses used to identify web pages or resources on the internet.

The term "weblink" refers to a clickable link that takes the user to a webpage or resource on the internet.

The term "Document Object Model" refers to a programming interface that represents the structure of web pages and enables developers to manipulate the content and behavior of web pages.

The term "Artificial intelligence model" or "AI model" refers to a computer program that uses artificial intelligence techniques, such as machine learning or deep learning, to analyze data and make predictions or decisions based on that data. The model is created by training it on a large dataset that has been labeled with the correct outcomes, such as a set of labeled images or a set of text documents with known classifications. The AI model then uses this training data to learn patterns and relationships within the data, and can make predictions or decisions on new, unseen data. In an example, the AI models can be used for computer vision. Examples of AI models that can be used for computer vision comprise Convolutional Neural Networks (CNNs), Recurrent Neural Networks (RNNs), Generative Adversarial Networks (GANs), Region-based CNNs (R-CNNs) and Mask R-CNN.

As used herein "Machine learning" refers to algorithms that give a computer the ability to learn without explicit programming, including algorithms that learn from and make predictions about data. Machine learning techniques include, but are not limited to, support vector machine, artificial neural network (ANN) (also referred to herein as a "neural net"), deep learning neural network, logistic regression, discriminant analysis, random forest, linear regression, rules-based machine learning, Naive Bayes, nearest neighbor, decision tree, decision tree learning, and hidden Markov, etc. For the purposes of clarity, part of a machine learning process can use algorithms such as linear regression or logistic regression. However, using linear regression or another algorithm as part of a machine learning process is distinct from performing a statistical analysis such as regression with a spreadsheet program. The machine learning process can continually learn and adjust the classifiers as new data becomes available and does not rely on explicit or rules-based programming. The ANN and CNN may be featured with a feedback loop to adjust the system output dynamically as it learns from the new data as it becomes available. In machine learning, backpropagation and feedback loops are used to train the AI/ML model improving the model's accuracy and performance over time. Statistical modeling relies on finding relationships between variables (e.g., mathematical equations) to predict an outcome.

As used herein, the term "Data mining" is a process used to turn raw data into useful information.

As used herein, the term "Data set" (or "Dataset") is a collection of data. In the case of tabular data, a data set corresponds to one or more database tables, where every column of a table represents a particular variable, and each row corresponds to a given record of the data set in question. The data set lists values for each of the variables, such as height and weight of an object, for each member of the data set. Each value is known as a datum. Data sets can also consist of a collection of documents or files.

As used herein, "time-to-live" or "TTL" value refers to a mechanism used to limit the lifespan or hop count of a packet of data sent across a network. It is a field in the packet header that is decremented by one by each router or network device that handles the packet.

The term "web scraper" refers to a software tool or bot that automatically extracts data from websites, typically for use in data analysis or other applications.

As referred herein, the term "image augmentation" refers to a technique used in computer vision and machine learning to increase the diversity and amount of training data by applying various transformations to existing images. These transformations can include rotation, scaling, flipping, cropping, changing the brightness and contrast, adding noise, and many others.

Phishing websites are designed to deceive users into providing sensitive information or performing malicious actions, such as downloading malware or transferring funds to a fraudulent account.

An embodiment relates to a system for automatic phishing website detection. The system comprising a weblink retrieval unit configured to obtain a weblink of a website of interest, a website capturing unit configured to capture a first image of the website of interest, a detection unit configured to detect a similarity between the first image of the website of interest and a list of pre-configured legitimate websites corresponding to a label in a database, an IP address grabbing unit configured to grab an IP address of the website of interest if the similarity is detected, a comparison unit configured to compare the IP address of the website of interest with a database of legitimate IP addresses in at least one of a static context and a dynamic context to identify a difference, and an alarm unit configured to generate a phishing website alarm based on a presence of the difference.

In an embodiment the similarity between the first image and the second image is in the range of a range of 70% to 99.9%.

In an embodiment, the system further comprises an information unit configured to send information about a known phishing website to at least one of a domain owner and a repository on an as-needed basis.

In another embodiment, the system further comprises a collection unit to store details and information related to the known phishing websites and legitimate websites.

In yet another embodiment, the system further comprises an automated web scraping configured to collect a list of legitimate URLs corresponding to the legitimate website.

In yet another embodiment, the weblink retrieval unit prompts a command to enter the weblink of the website of interest.

In yet another embodiment, the website capturing unit comprises web crawlers to capture the first image of the website of interest.

In yet another embodiment, the website capturing unit is configured to convert an HTML file to the first image.

In yet another embodiment, the detection unit utilizes computer vision to detect the similarity between the first image of the website of interest and the list of pre-configured legitimate websites.

In yet another embodiment, the computer vision comprises an artificial intelligence model.

In yet another embodiment, the artificial intelligence model comprises a machine learning algorithm.

In yet another embodiment, the machine learning algorithm is configured to train the artificial intelligence model.

In yet another embodiment, the machine learning algorithm is a neural network model.

In yet another embodiment, the neural network model is a convolutional neural network model.

In yet another embodiment, the machine learning module is configured to train at least based on one of an evolutionary algorithm and a reinforcement learning based algorithm.

In yet another embodiment, the machine learning module is configured to train the detection unit and the comparison unit of the system.

In yet another embodiment, the system is further configured to retrieve a first digital certificate of the website of interest and compare the first digital certificate of the website of interest with a digital certificate of the legitimate website that the image was classified into, via the comparison unit, to identify a second difference.

Referring to FIG. 1, it shows a schematic diagram of a phishing detection system, according to at least some embodiments of the present disclosure. The system 100 comprises a weblink retrieval unit 102, an IP address grabbing unit 104, a website capturing unit 106, a processing unit 108 and an alarm unit 114. The weblink retrieval unit 102 is configured to obtain a weblink of a website of interest via a user interface. The IP address grabbing unit 104 is configured for grabbing an IP address of the website of interest. The website capturing unit 106 is configured for capturing an image of the website of interest. The comparison unit 110b further comprises an IP address comparison unit and a digital certificate comparison unit. The detection unit 110a is configured for detecting similarity between the dataset of the image of the website of interest and a list of pre-configured legitimate websites (datasets) corresponding to a label in a resource database 120. The IP address comparison unit is configured to compare the IP address of the website of interest with a database of legitimate IP addresses in at least one of a static or dynamic context to identify a first difference. The digital certificate comparison unit is configured to compare the digital certificate of the website of interest with the digital certificate of the legitimate website that the image was classified into to identify a second difference. The alarm unit 114 is configured to generate a phishing website alarm based on a presence of at least two of the similarity, the first difference and the second difference.

In an embodiment, the weblink retrieval unit 102 can retrieve a weblink using one of a web browser, a bookmark manager, a search engine, a social media platform and a content aggregation platform.

In some embodiments, the IP address grabbing unit 104 can grab an IP address of a weblink by performing a DNS (Domain Name System) lookup. The system can extract the hostname from the weblink and perform a DNS lookup to resolve the hostname to an IP address. In some embodiments, the DNS lookup can be performed using a DNS resolver library or tool (e.g., Python's socket library, nslookup command-line tool, etc.). If the DNS lookup is successful, the application will receive one or more IP addresses associated with the hos tname. The system can choose to use the first IP address returned, or it can try multiple IP addresses in case one is unavailable. The system can use the grabbed IP address to connect to the web server hosting the website, or the system can use the grabbed IP address for other purposes, such as geolocation and network analysis.

In an embodiment, the website capturing unit 106 can utilize a web crawler to capture an image of the website of interest. The web crawler, also known as a spider or a bot, can be used to capture an image of a website by using a tool or library designed for taking screenshots of web pages. The web crawler will identify the URL of the website to capture an image by searching for websites that match specific criteria. Once the web crawler has identified the URL, it can then use a tool or library that can capture a screenshot of the website. The non-limiting examples of the tools and libraries available for this purpose are PhantomJS, Selenium, or Puppeteer and the like. The web crawler can then use the tool or library to navigate to the website and take a screenshot of the page. The tool or library may also allow the web crawler to specify the size of the screenshot, the format of the image, and other settings. The web crawler will send the captured image to the processing unit.

In an embodiment, the processing unit 108 comprises a machine learning platform for feature analysis. In some embodiments, the machine learning platform comprises one or more neural networks. The neural network further comprises a learning framework 112 configured for automatically learning complex features and relevant feature representations. In some embodiments, the neural network comprises a deep neural network. In some embodiments, the neural network comprises a long short-term memory network. In some embodiments, the neural network comprises a convolutional neural network. The comparison unit 110b may utilize the neural network and/or machine learning models to identify if a website is a phishing website or a legitimate website.

Figure 2:
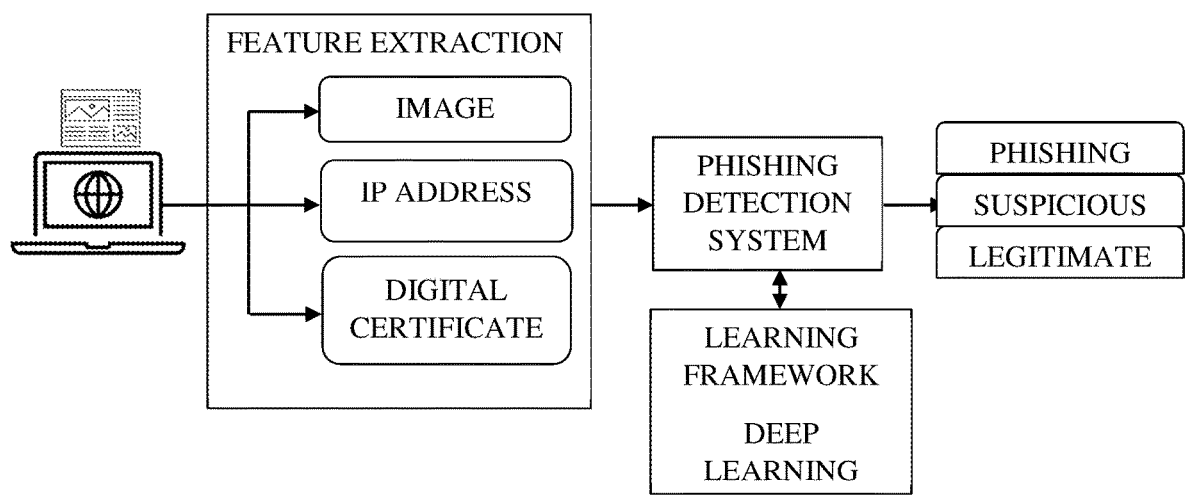
FIG. 2 shows a schematic diagram of the functional workflow of the system, according to one or more embodiments.

Referring to FIG. 2, it shows a schematic diagram of the phishing detection functional workflow of the system, according to one or more embodiments. The neural network can extract features from the image of the website of interest, the IP address of the website of interest and the digital certificate of the website of interest. The system utilizes the learning framework and the deep learning models to identify if the website of interest is a phishing website, a suspicious website, or a legitimate website.

Figure 3:
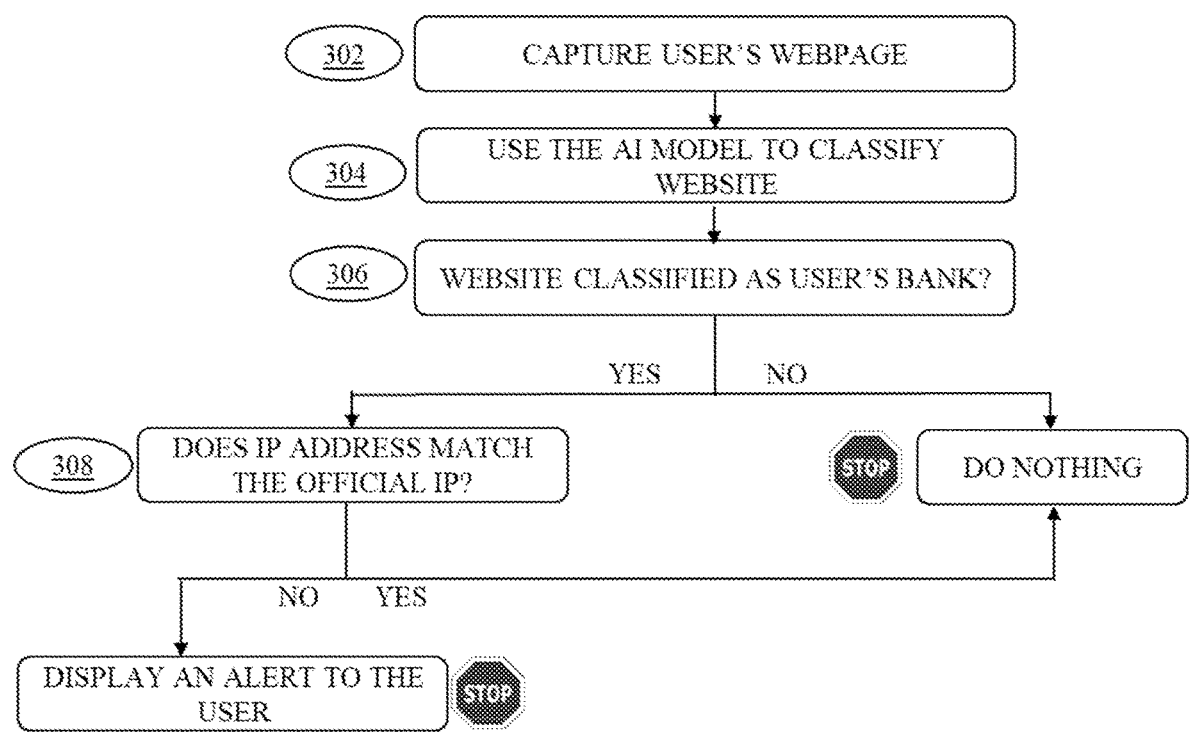
FIG. 3 shows a flowchart of the process of phishing website detection by the system, according to one or more embodiments.

Referring to FIG. 3, it shows a flowchart of the process of phishing website detection for a user's bank by the system, according to one or more embodiments. In step 302 the system captures the user's web page. In step 304, the system uses the AI model to classify the website. In step 306, the system checks if a website is classified as a user's bank. If the website classified is not a user's bank, the process stops, and the system does not generate any output. If the website classified is a user's bank, the system detects if the IP address of the webpage matches with the official IP address 308. If the IP address of the webpage matches with the official IP address, the process stops, and the system does not generate any output. If the IP address of the webpage does not match with the official IP address, the system generates an alert and displays the alert to the user.

In some embodiments, the comparison unit utilizes packet header information analysis. The analysis of packet header information comprises examining the source and destination IP addresses, as well as other information in the header, such as the time-to-live (TTL) value. If the TTL value is lower than expected, it may indicate that the packet has traveled a longer distance than it should have, which could be a sign of a phishing website.

Detecting phishing websites using digital certificate comparison requires a combination of techniques, including feature extraction, machine learning algorithms, and a scoring system. In an embodiment, the comparison unit compares the digital certificate presented by the website of interest with a known or trusted certificate. In some embodiments, a neural network can be trained on a large dataset of known phishing websites and legitimate websites, along with their corresponding digital certificates. This dataset can be obtained from various sources, such as phishing repositories, certificate authorities, or web crawlers. The neural network can extract features from the digital certificate, such as the issuer, subject, expiration date, and signature algorithm. These features can be used to compare the digital certificate with a known or trusted certificate. The neural network can use machine learning algorithms to analyze and learn from patterns in the digital certificates. By training the neural network on a large dataset of known phishing websites and legitimate websites, the network can learn to recognize patterns that indicate a phishing attempt. The neural network can assign a score to each website based on the similarity between its digital certificate and a known or trusted certificate. The score can be used to rank the websites and flag those that have a high likelihood of being a phishing website.

In some embodiments, the comparison unit utilizes analyzing the behavior of the network traffic. For example, if the network traffic is coming from a single source IP address but the volume or pattern of the traffic is unusual, it could be a sign of a phishing website.

In some embodiments, the comparison unit utilizes machine learning algorithms to analyze and learn from patterns in network traffic. By training the neural network on a large dataset of known malicious and benign traffic, the network can learn to recognize patterns that indicate a sign of a phishing website.

Figure 4:
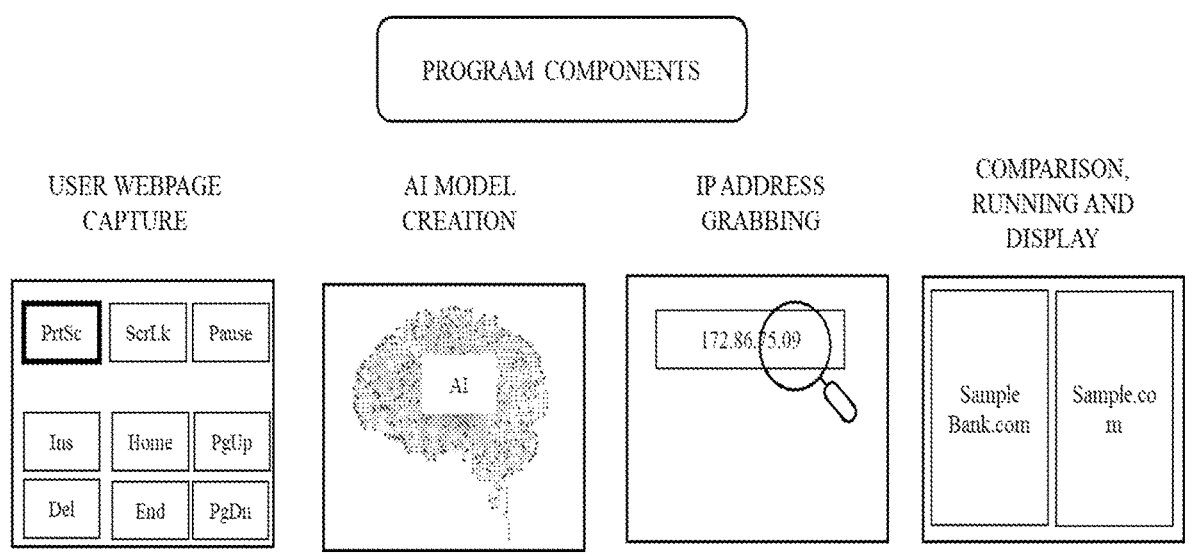
FIG. 4 shows program components of the system, according to one or more embodiments.

Referring to FIG. 4, it shows program components of the system, according to one or more embodiments. The program components of the system comprise a webpage capture component, an artificial intelligence (AI) model creation component, an IP address grabbing component and a comparison, running and display component.

Figure 5:
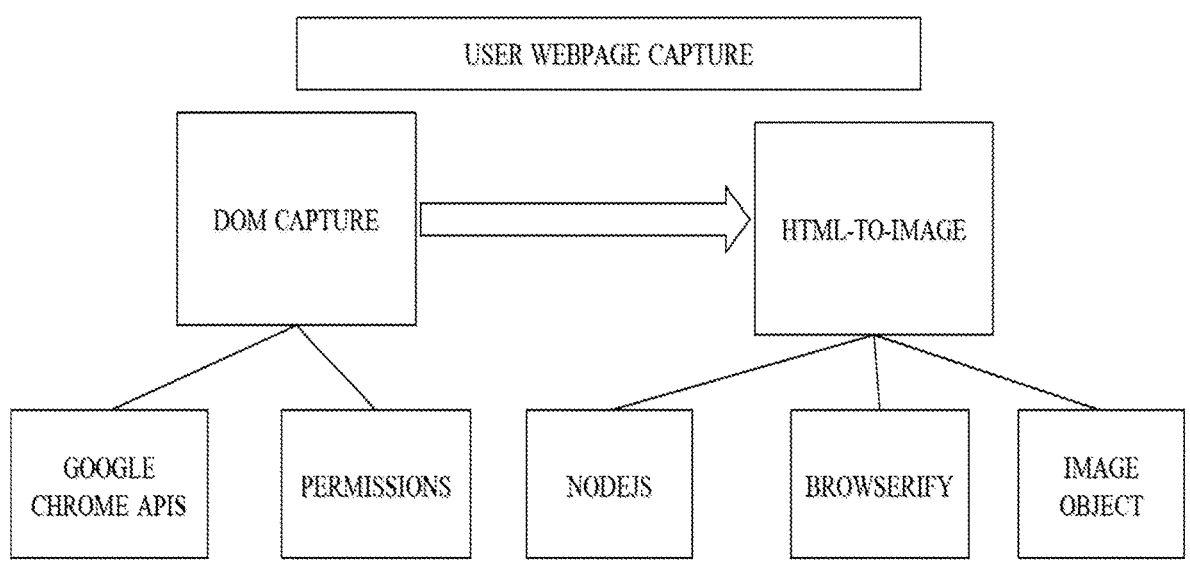
FIG. 5 illustrates a high-level software architecture of the system, according to one or more embodiments.

Referring to FIG. 5, it illustrates a high-level software architecture of the system, according to one or more embodiments. In an example, the webpage capture component is configured for capturing the Document Object Model (DOM) of a web page or application. The webpage capture component may utilize Browser APIs to capture the DOM and view the properties and values of each element, including permissions. Headless browsers like Puppeteer or Selenium WebDriver can be used to automate the process of capturing the DOM. The captured DOM is converted from HTML file to image using an appropriate tool. In an example, the webpage capture component utilizes at least one of a nodejs, browserify, and image object.

Figure 6A:
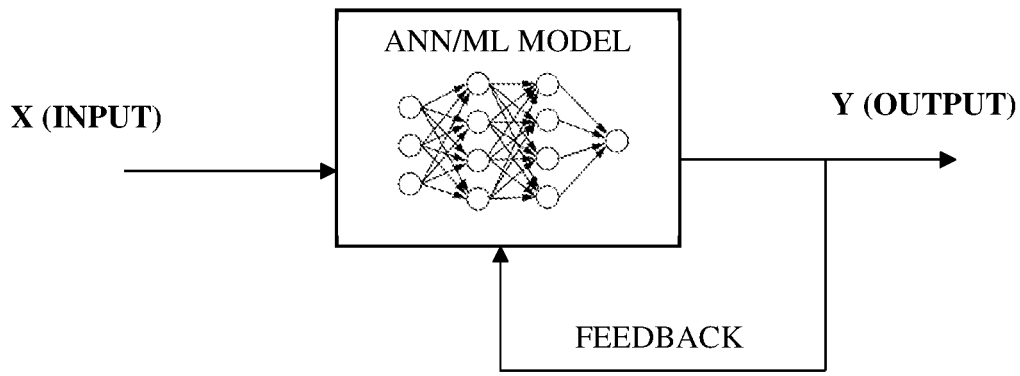
FIG. 6A shows a structure of the neural network/machine learning model with a feedback loop.

FIG. 6A shows a structure of a neural network/machine learning model with a feedback loop. Artificial neural networks (ANNs) model comprises an input layer, one or more hidden layers, and an output layer. Each node, or artificial neuron, connects to another and has an associated weight and threshold. If the output of any individual node is above the specified threshold value, that node is activated, sending data to the next layer of the network. Otherwise, no data is passed to the next layer of the network. A machine learning model or an ANN model may be trained on a set of data to take a request in the form of input data, make a prediction on that input data, and then provide a response. The model may learn from the data. Learning can be supervised learning and/or unsupervised learning and may be based on different scenarios and with different datasets. Supervised learning comprises logic using at least one of a decision tree, logistic regression, and support vector machines. Unsupervised learning comprises logic using at least one of a k-means clustering, a hierarchical clustering, a hidden Markov model, and an apriori algorithm. The output layer may predict or detect a health issue and the severity of the health issue based on the input data.

In an embodiment, ANN's may be a Deep-Neural Network (DNN), which is a multilayer tandem neural network comprising Artificial Neural Networks (ANN), Convolution Neural Networks (CNN) and Recurrent Neural Networks (RNN) that can recognize features from inputs, do an expert review, and perform actions that require predictions, creative thinking, and analytics. In an embodiment, ANNs may be Recurrent Neural Network (RNN), which is a type of Artificial Neural Networks (ANN), which uses sequential data or time series data. Deep learning algorithms are commonly used for ordinal or temporal problems, such as language translation, Natural Language Processing (NLP), speech recognition, and image recognition, etc. Like feedforward and convolutional neural networks (CNNs), recurrent neural networks utilize training data to learn. They are distinguished by their "memory" as they take information from prior input via a feedback loop to influence the current input and output. An output from the output layer in a neural network model is fed back to the model through the feedback loop. The variations of weights in the hidden layer(s) will be adjusted to fit the expected outputs better while training the model. This will allow the model to provide results with far fewer mistakes.

The neural network is featured with the feedback loop to adjust the system output dynamically as it learns from the new data. In machine learning, backpropagation and feedback loops are used to train an AI model and continuously improve it upon usage. As the incoming data that the model receives increases, there are more opportunities for the model to learn from the data. The feedback loops, or backpropagation algorithms, identify inconsistencies and feed the corrected information back into the model as an input.

Even though the AI/ML model is trained well, with large sets of labeled data and concepts, after a while, the models' performance may decline while adding new, unlabeled input due to many reasons which include, but not limited to, concept drift, recall precision degradation due to drifting away from true positives, and data drift over time. A feedback loop to the model keeps the AI results accurate and ensures that the model maintains its performance and improvement, even when new unlabeled data is assimilated. A feedback loop refers to the process by which an AI model's predicted output is reused to train new versions of the model.

Initially, when the AI/ML model is trained, a few labeled samples comprising both positive and negative examples of the concepts (for e.g., similarities and dissimilarities) are used that are meant for the model to learn. Afterward, the model is tested using unlabeled data. By using, for example, deep learning and neural networks, the model can then make predictions on whether the desired concept/s (for e.g., phishing website that needs to be detected) are in unlabeled images. Each dataset is given a probability score where higher scores represent a higher level of confidence in the models' predictions. Where a model gives an image a high probability score, it is auto labeled with the predicted concept. However, in the cases where the model returns a low probability score, this input may be sent to a controller (maybe a human moderator) which verifies and, as necessary, corrects the result. The human moderator may be used only in exceptional cases. The feedback loop feeds labeled data, auto-labeled or controller-verified, back to the model dynamically and is used as training data so that the system can improve its predictions in real-time and dynamically.

An embodiment relates to a method for automatic phishing website detection. The method comprises collecting image dataset for phishing website and legitimate websites from at least one of a data feed and a data sources, clustering of the image dataset using visual similarity tool, automatically labeling of an image of the image dataset to create a labeled dataset, linking the labeled dataset with a screenshot the image, extracting image features the image using a pre-trained convolutional neural network model, training a fully connected layer of the pre-trained convolutional neural network model to classify a custom image dataset to obtain a re-trained convolutional neural network model, and detecting a phishing website using the re-trained convolutional neural network model.

Figure 6B:
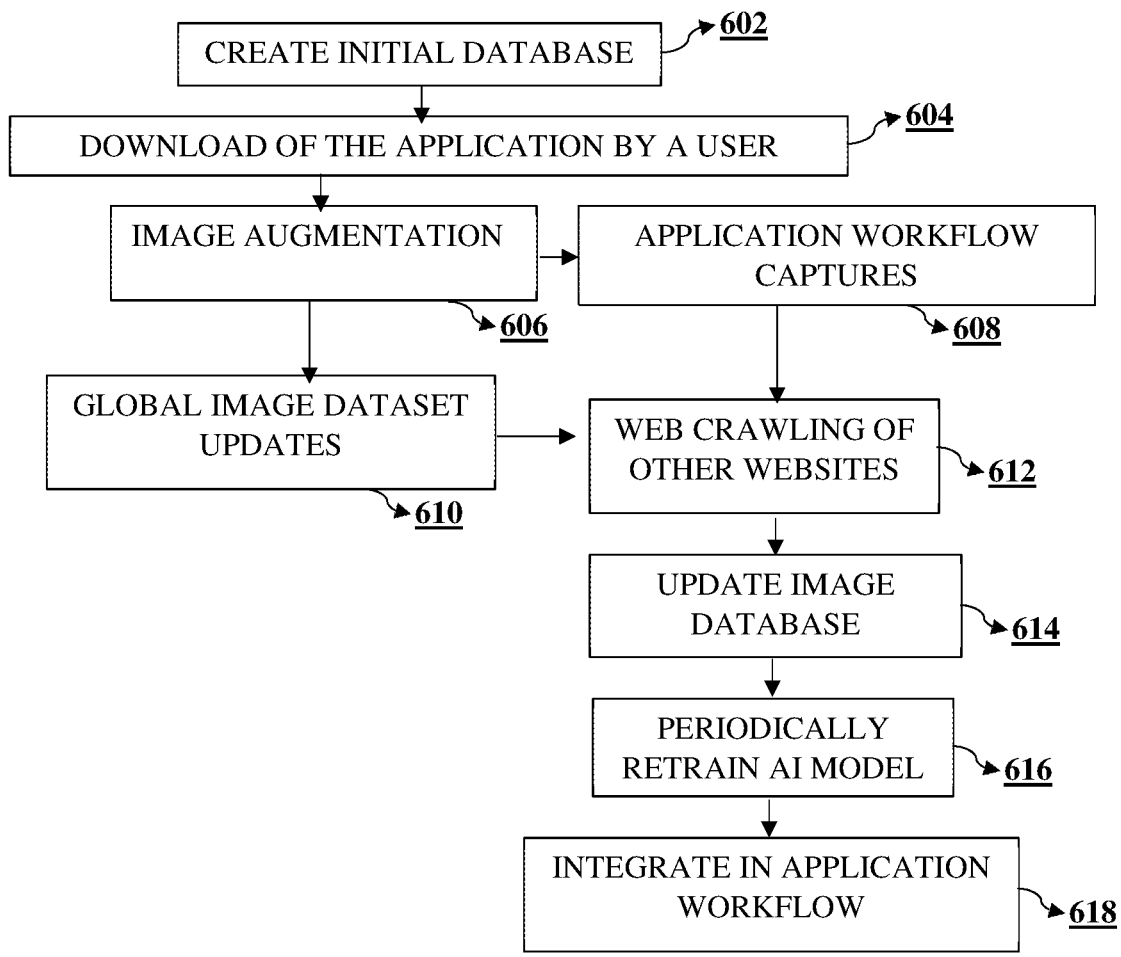
FIG. 6B is a block chart illustrating artificial intelligence model feedback propagation by the system, according to one or more embodiments.

Referring to FIG. 6B, is a block chart illustrating artificial intelligence model feedback propagation by the system, according to one or more embodiments. The AI model utilizes the steps illustrated in FIG. 6B in order to improve upon itself in an automated way. Each user begins to contribute to the AI model once they have downloaded the application. In step 604, the user can download the application via one of an in-house App store, a website, an email through a link, Over-the-air (OTA) and a third-party app store. At step 602, an initial database is created to generate and evaluate an artificial intelligence model. A representative set of images are collected. This set should include variations in lighting, angles, colors, and other factors that may affect the image comparison task. The images can be annotated with labels or tags that describe the contents of the images. For example, the images might annotate the images with the look and feel of a legitimate website and a phished website. The application preprocesses the images to ensure they are in a consistent format and size. This step may involve resizing the images, converting them to grayscale, or applying other filters. A deep learning model, such as a convolutional neural network (CNN), learns to recognize the patterns in the images that correspond to the annotated labels. Once the model is used to compare new images by feeding them into the model and comparing the output. The model is fine-tuned or retrained as needed to improve its performance on the specific image comparison task. The AI model can use one or more of image augmentation 606, application workflow capture 608, global image dataset 610 and web crawling of other websites 612 to identify new image datasets and update the image database in step 614. In step 604, image augmentation is used to increase the diversity and amount of training data by applying various transformations. By augmenting the training dataset with transformed images, the model can learn to be more robust to variations in the input data and improve its performance on real-world data. Image augmentation can enhance the performance of the applications such as object detection, image classification, and segmentation. In step 614, the application updates the image database based on an update in the global image dataset (as depicted in step 610). In step 612, the web crawler using the AI model can visit various websites and capture images. In step 616, the updated image database is periodically retrained using at least one of a reinforcement learning algorithm and evolutionary AI algorithms. In step 618, the updated AI model is integrated in application workflow for automatic detection of a phishing website.

Figure 7A:
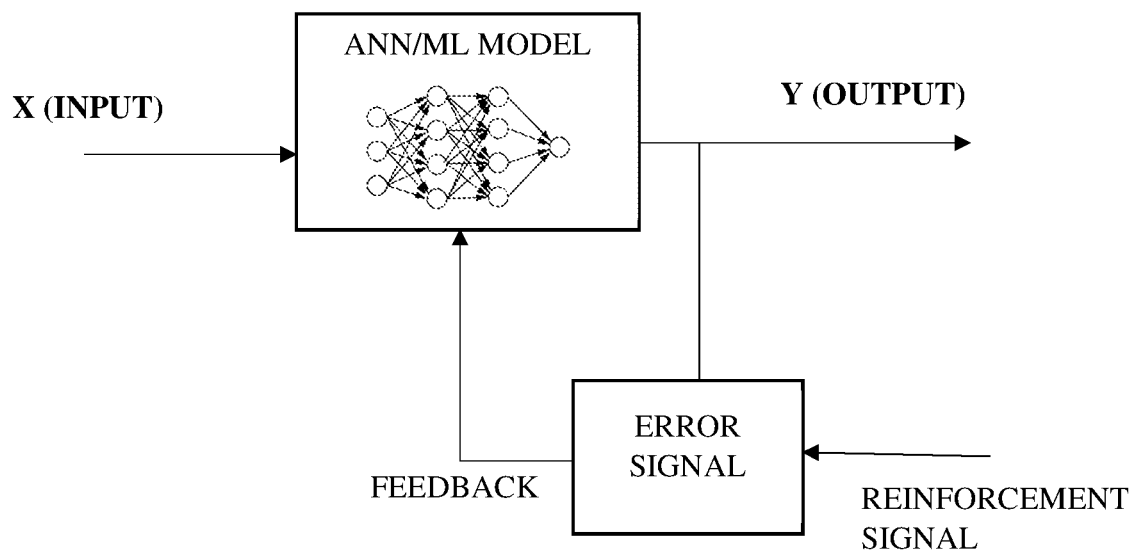
FIG. 7A shows a structure of the neural network/machine learning model with reinforcement learning.

FIG. 7A shows a structure of the neural network/machine learning model with reinforcement learning. The network receives feedback from authorized networked environments. Though the system is similar to supervised learning, the feedback obtained in this case is evaluative not instructive, which means there is no teacher as in supervised learning. After receiving the feedback, the network performs adjustments of the weights to get better predictions in the future. Machine learning techniques, like deep learning, allow models to take labeled training data and learn to recognize those concepts in subsequent data and images. Data may be fed back to the model for testing, hence by feeding the model with data it has already predicted over, the training gets reinforced. If the machine learning model has a feedback loop, a reward for each true positive of the output of the system is given to further reinforce the learning. Feedback loops ensure that AI results do not stagnate. By incorporating a feedback loop, the model's output keeps improving dynamically and over usage/time.

Figure 7B:
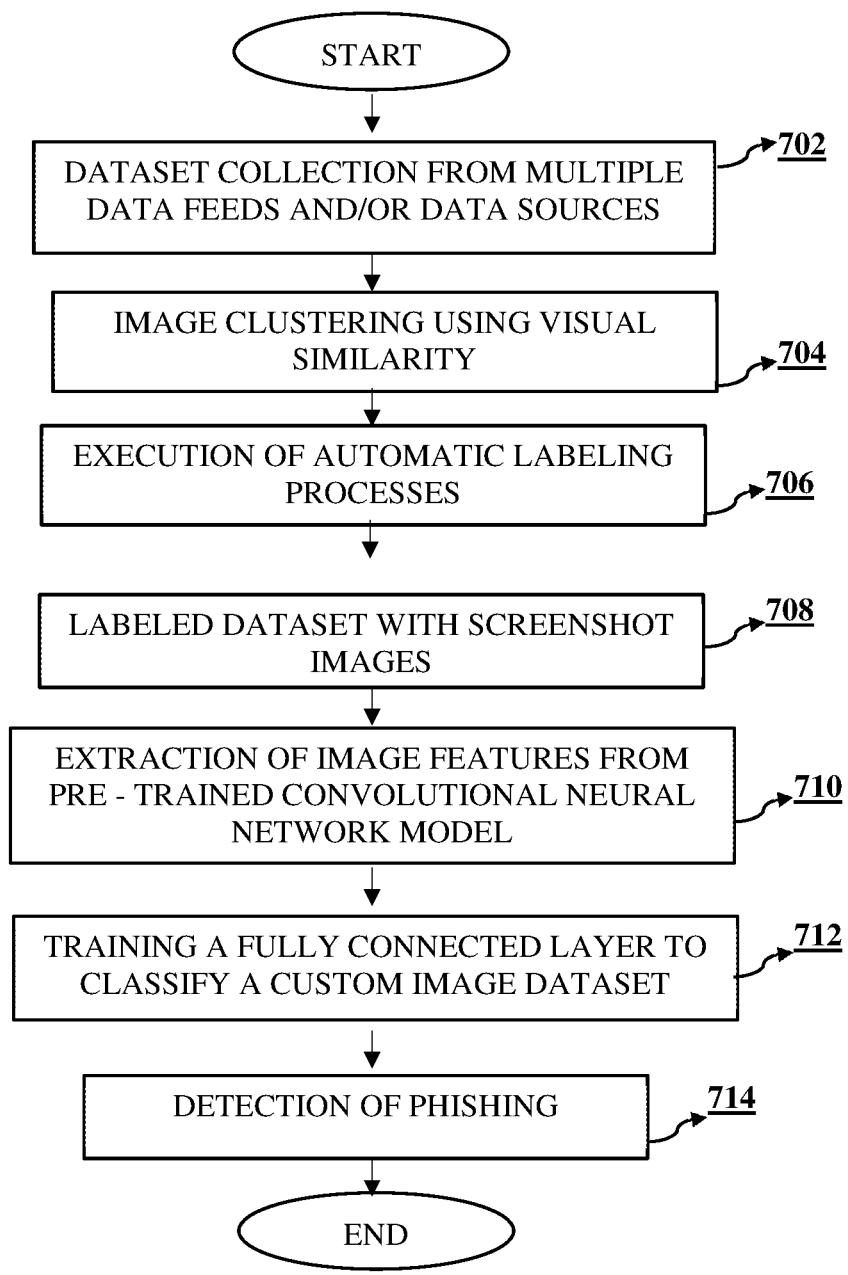
FIG. 7B is a block chart illustrating an example of a deep convolutional neural network for the detection of phishing, according to one or more embodiments.

Referring to FIG. 7B, is a block chart illustrating an example of a deep convolutional neural network for the detection of phishing, according to an embodiment.

In some embodiments, the machine learning model recurrently or iteratively collects web elements from different data feeds and/or data sources 702. Examples of such web elements can include URLs, IP addresses, screenshots or images of phishing websites, screenshots or images of trusted third-party websites, phishing emails, logos, logo marks, and/or logotypes. The web elements can be retrieved at the packet level (e.g., via a sniffer), from the Internet, the World Wide Web (e.g., via a crawler) or other suitable computer network, from email traffic (e.g., via SMTP protocol monitor), from publicly available blacklist databases (e.g., IP-based addresses blacklist databases, domain-based blacklist databases) and from other suitable sources. Accordingly, the automated collection of datasets from multiple and diverse sources enables the machine learning model to improve the detection of phishing website and can be recurrently or iteratively retrained with different or subsequent training datasets having new web elements not included in training datasets used in previous training phases.

In some embodiments, the machine learning model can produce subsequent datasets at periodic intervals of time and for each periodic interval of time new features can be extracted from such subsequent datasets. Thus, one or more neural networks and/or pre-trained neural networks can be re-trained at each periodic interval of time and learn to identify web pages, URLS, logos, logotypes, logo marks or other suitable type of web elements. Likewise, one or more CNNs and/or pre-trained CNN can be re-trained at each periodic interval of time and learn to identify web pages, URLS, logos, logotypes, logo marks or other suitable type of web elements that are associated with different legitimate websites. Differently stated, because the CNN can learn iteratively from new samples collected by the machine learning model, the CNN can preemptively detect new web elements associated with existent or new phishing websites.

In some embodiments, web elements collected as images can be clustered by one or more visual similarity techniques 704. Visual similarity techniques are a type of content-based image analysis that involves computing similarity measures between images based on features of such images. Examples of image features often used in visual similarity techniques include the form of edges included in an image, colors, types of textures determined based on pixel values, shape measures, salient point or regions and other suitable features. Some examples of distances or similarity measures that can be computed to compare the similarity of images include grayscale image distance, spectrum image distance, color histogram distance, texture histogram distance, and other suitable distances. Thereafter, a clustering process can be executed to group images, based on the computed distances, into clusters or groups. The clustering process ends up grouping together images that have the most similarities in common. Some examples of clustering techniques that can be used include a k-means clustering technique, Linde-Buzo-Gray technique, or other centroid-based clustering algorithm.

Thereafter, or in parallel, each retrieved image can be labeled using, for example, an optical character recognition (OCR) process at 706. The OCR process executed produces one or more labels based on the content of each retrieved image. The OCR process can include operations to identify text included in an image, perform character segmentation (i.e., decompose an image including text into a set of images, each image including one character), perform feature extractions from the images, convert, based on the extracted features, each image into a character code (e.g., American Standard Code for Information Interchange), and produce a label based on the character codes. In some instances, OCR is performed at 706 only on the centroid of each cluster from a set of clusters of images and all the images are labeled in that cluster with a label extracted from the centroid. In some other implementations, the detector unit can be trained and used to perform the automatic labeling process shown at 706.

The labeled images 708 can include images of web elements of phishing websites and/or images from legitimate websites. In some implementations, the features of the labeled images can be extracted 710 through, a feature extractor process and the fully connected layer of the neural network can be trained or retrained 712, such that the fully connected layer of the neural network output 714 is a similarity score to determine whether an unseen image is part of a phishing website or a legitimate website.

An embodiment relates to a method for automatic phishing website detection. The method comprising obtaining a weblink of a website of interest, capturing a first image of the website of interest, detecting a similarity between the first image of the website of interest and a second image of a legitimate website, grabbing a first IP address of the website of interest if the similarity is detected, comparing the first IP address of website of interest with a second IP address of the legitimate website to detect a difference, and generating a phishing website alarm based on a presence of the difference.

In some embodiments, the weblink of the website of interest is obtained via a user interface.

In another embodiment, retrieving the image of the website can be done using at least one of network scanning, capturing a Document Object Model (DOM) of the website of interest and creating an image with the captured model utilizing a web scraper, and a mechanism in which rendering and screenshotting the website in question will take place.

In yet another embodiment, comparing the IP addresses is done using at least one of an exact match algorithm, subnet match algorithm, geolocation match algorithm and behavior-based match algorithm.

In yet another embodiment, the similarity between the first image of the website of interest and the second image of the legitimate website is detected using a machine learning model.

In yet another embodiment, the machine learning model is pre-trained.

In yet another embodiment, the machine learning model comprises at least one of a deep learning neural network model and a shallow learning artificial intelligence model.

In yet another embodiment, the method further comprises maintaining and updating an image database comprising a series of images and associated labels of the website of interest.

In yet another embodiment, the image database is used to update the machine learning model on similarity for images of the website of interest.

In yet another embodiment, the method further comprises expanding datasets in the image database through image augmentation.

In yet another embodiment, the method further comprises periodically training the machine learning model using the image database that is maintained through automated software features.

In yet another embodiment, the machine learning model is utilized in a workflow of an application.

In yet another embodiment, the machine learning model utilizes a classification algorithm for detecting similarity between the website in question and one of many legitimate websites that are stored in the database.

In yet another embodiment, the application resides on a browser as an add-on extension.

In yet another embodiment, the image database comprises extensible database functionality to save a procured new image from a global phishing incident into one or more global databases.

In yet another embodiment, an output of the detecting, determining, and comparing after validation is feedback to the machine learning model for re-training and updating.

In yet another embodiment, the method further comprises retrieving a first digital certificate of the website of interest, and comparing the first digital certificate of the website of interest with a digital certificate of the legitimate website that the image was classified into, via the comparison unit, to identify a second difference.

In yet another embodiment, the first IP address is a public IP address.

Figure 8A:
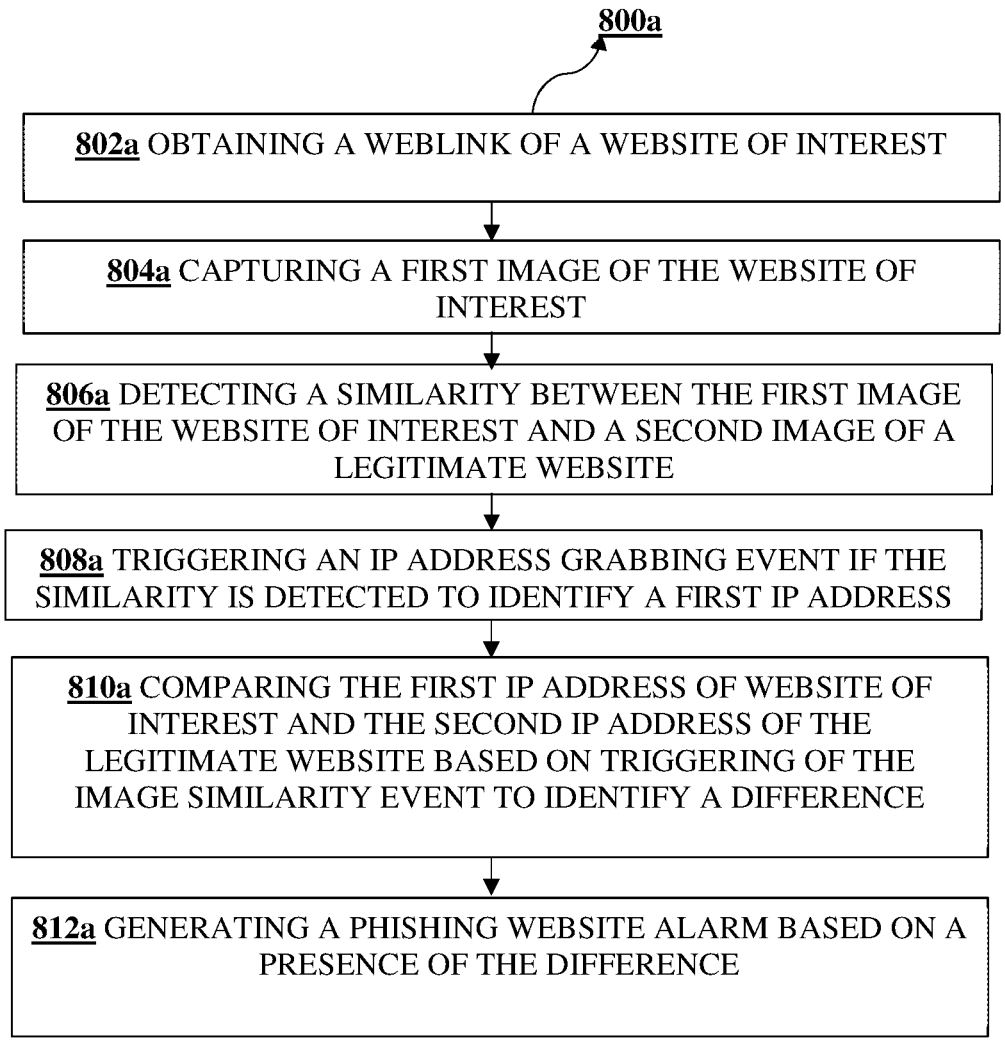
FIG. 8A shows a first method for phishing website detection, according to one or more embodiments.

Referring to FIG. 8A, it shows a method for phishing website detection according to one or more embodiments. The method 800a utilizes image similarity and IP address differences between the phishing website and the legitimate website to detect phishing and generate an alarm if the application suspects phishing. Step 802a of the method 802a comprises obtaining a weblink of a website of interest. Step 804a of the method 802a comprises capturing a first image of the website of interest. Step 806a of the method 802a comprises detecting a similarity between the first image of the website of interest and a second image of a legitimate website. Step 808a of the method 802a comprises triggering an IP address grabbing event if the similarity is detected to identify a first IP address. Step 810a of the method 802a comprises comparing the first IP address of the website of interest and a second IP address of the legitimate website based on triggering of the image similarity event to identify a difference. Step 812a of the method 802a comprises generating a phishing website alarm based on a presence of the difference.

An embodiment relates to a non-transitory computer-readable storage medium for automatic phishing website detection. The non-transitory computer-readable storage medium, storing executable instructions, when executed by a processor, causing the processor to implement a machine learning (ML)-based phishing protection method, the method comprising obtaining a weblink of a website of interest, capturing a first image of the website of interest, detecting a similarity between the first image of the website of interest and a second image of a legitimate website, grabbing a first IP address of the website of interest if the similarity is detected, and comparing the first IP address of the website of interest with a second IP address of the legitimate website to detect a difference.

An embodiment relates to a system for automatic phishing website detection. The system comprising a weblink retrieval unit configured to obtain a weblink of a website of interest, a website capturing unit configured to capture a first image of the website of interest, a detection unit configured to detect a similarity between the first image of the website of interest and a list of pre-configured legitimate websites corresponding to a label in a database, a digital certificate capture unit configured to grab a first digital certificate of the website of interest if the similarity is detected, a comparison unit configured to compare the first digital certificate of the website of interest with second digital certificate of the legitimate website in at least one of a static context and a dynamic context to identify a difference, and an alarm unit configured to generate a phishing website alarm based on a presence of the difference.

An embodiment relates to a method for automatic phishing website detection. The method comprising obtaining a weblink of a website of interest, capturing a first image of the website of interest, detecting a similarity between the first image of the website of interest and a list of pre-configured legitimate websites corresponding to a label in a database, grabbing a first digital certificate of the website of interest if the similarity is detected, comparing the first digital certificate of the website of interest with second digital certificate of the legitimate website in at least one of a static context and a dynamic context to identify a difference, and generating a phishing website alarm based on a presence of the difference.

Figure 8B:
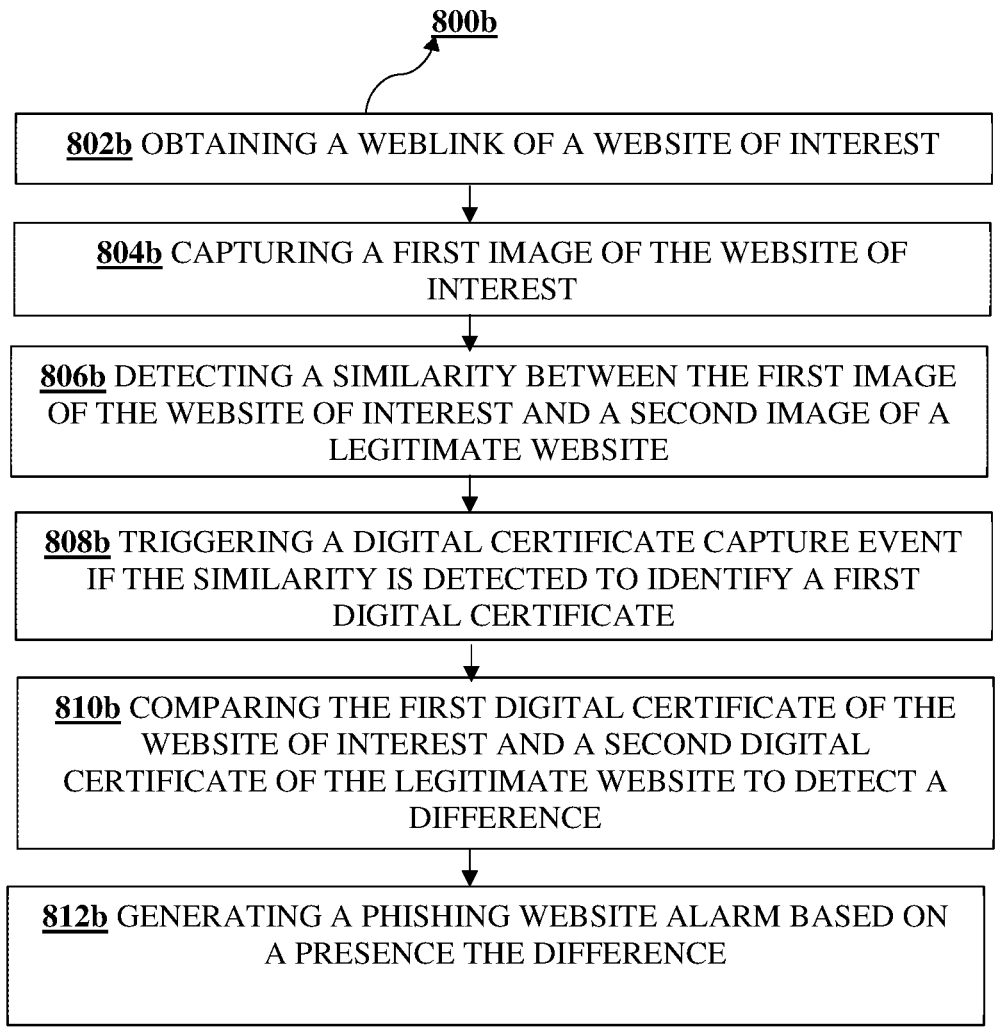
Referring to FIG. 8B, it shows a second method for phishing website detection, according to one or more embodiments.

Referring to FIG. 8B, it shows a method for phishing website detection according to one or more embodiments. The method 800b utilizes image similarity and digital certificate differences between the phishing website and the legitimate website to detect phishing and generate an alarm if the application suspects phishing. Step 802b of the method 802b comprises obtaining a weblink of a website of interest. Step 804b of the method 802b comprises capturing a first image of the website of interest. Step 806b of the method 802b comprises detecting a similarity between the first image of the website of interest and a second image of a legitimate website. Step 808b of the method 802b comprises triggering a digital certificate capture event if the similarity is detected to identify a first digital certificate. Step 810b of the method 802b comprises comparing the first digital certificate of the website of interest and a second digital certificate of the legitimate website to detect a difference. Step 812b of the method 802b comprises generating a phishing website alarm based on a presence of the difference.

An embodiment relates to a system for automatic phishing website detection. The system comprising a weblink retrieval unit configured to obtain a weblink of a website of interest, a website capturing unit configured to capture a first image of the website of interest, a detection unit configured to detect similarity between the first image of the website of interest and a list of pre-configured legitimate websites corresponding to a label in a database, an IP address grabbing unit configured to grab an IP address of the website of interest when the image similarity is found, a comparison unit configured to compare the IP address of the website of interest with a database of legitimate IP addresses in either a static context and a dynamic context to identify a first difference, and a digital certificate grabbing unit configured to grab a first digital certificate of the website of interest when the image similarity is found, a digital certificate comparison unit configured to compare the first digital certificate of the website of interest with a database of legitimate digital certificates to identify a second difference, and an alarm unit configured to generate a phishing website alarm based on a presence of at least one of the first difference and the second difference.

In an embodiment, the system further comprises an information unit configured to send information about a known phishing website to at least one of a domain owner and a repository on an as-needed basis.

In another embodiment, the system further comprises a collection unit to store details and information related to known phishing websites and legitimate websites. The details in the database comprise URL, IP address, Domain name, a date when the phishing website was reported or identified. The information in the database comprises brief description of the phishing website including the type of phishing attack (e.g., credential harvesting, malware distribution, etc.) and the targeted organization or service, source of the report or identification (such as a security researcher, organization, or individual), and current status of the phishing website (such as whether it is active or inactive, a verification status, and related URLs that are related to the phishing website, such as those used in redirection or landing pages). These details and information can be used by the system to develop and improve phishing detection. There are several public databases of phishing websites, such as the PhishTank, OpenPhish, and Google Safe Browsing. These databases contain details and information about phishing websites that have been reported and identified as malicious by security researchers, organizations, and individuals.

In yet another embodiment, the system further comprises an automated web scraping configured to collect a list of legitimate URLs corresponding to the legitimate website.

An embodiment relates to a method for automatic phishing website detection. The method comprising obtaining a weblink of a website of interest, capturing a first image of the website of interest, detecting similarity between the first image of the website of interest and a list of pre-configured legitimate websites corresponding to a label in a database, grabbing an IP address of the website of interest when a similarity is found, comparing the IP address of the website of interest with a database of legitimate IP addresses in at least one of a static context and a dynamic context to identify a first difference, grabbing a first digital certificate of the website of interest when the similarity is found, comparing the first digital certificate of the website of interest with a database of legitimate digital certificates to identify a second difference, and generating a phishing website alarm based on a presence of at least one of the first difference and the second difference.

An embodiment relates to a non-transitory computer-readable storage medium for automatic phishing website detection. The non-transitory computer-readable storage medium, storing executable instructions, when executed by a processor, causing the processor to implement a machine learning (ML)-based phishing protection method, the method comprising obtaining a weblink of a website of interest, capturing a first image of the website of interest, detecting similarity between the first image of the website of interest and a list of pre-configured legitimate websites corresponding to a label in a database, grabbing an IP address of the website of interest when a similarity is found, comparing the IP address of the website of interest with a database of legitimate IP addresses in at least one of a static context and a dynamic context to identify a first difference, grabbing a first digital certificate of the website of interest when the image similarity is found, comparing the first digital certificate of the website of interest with a database of legitimate digital certificates to identify a second difference, and generating a phishing website alarm based on a presence of at least one of the first difference and the second difference.

Figure 8C:
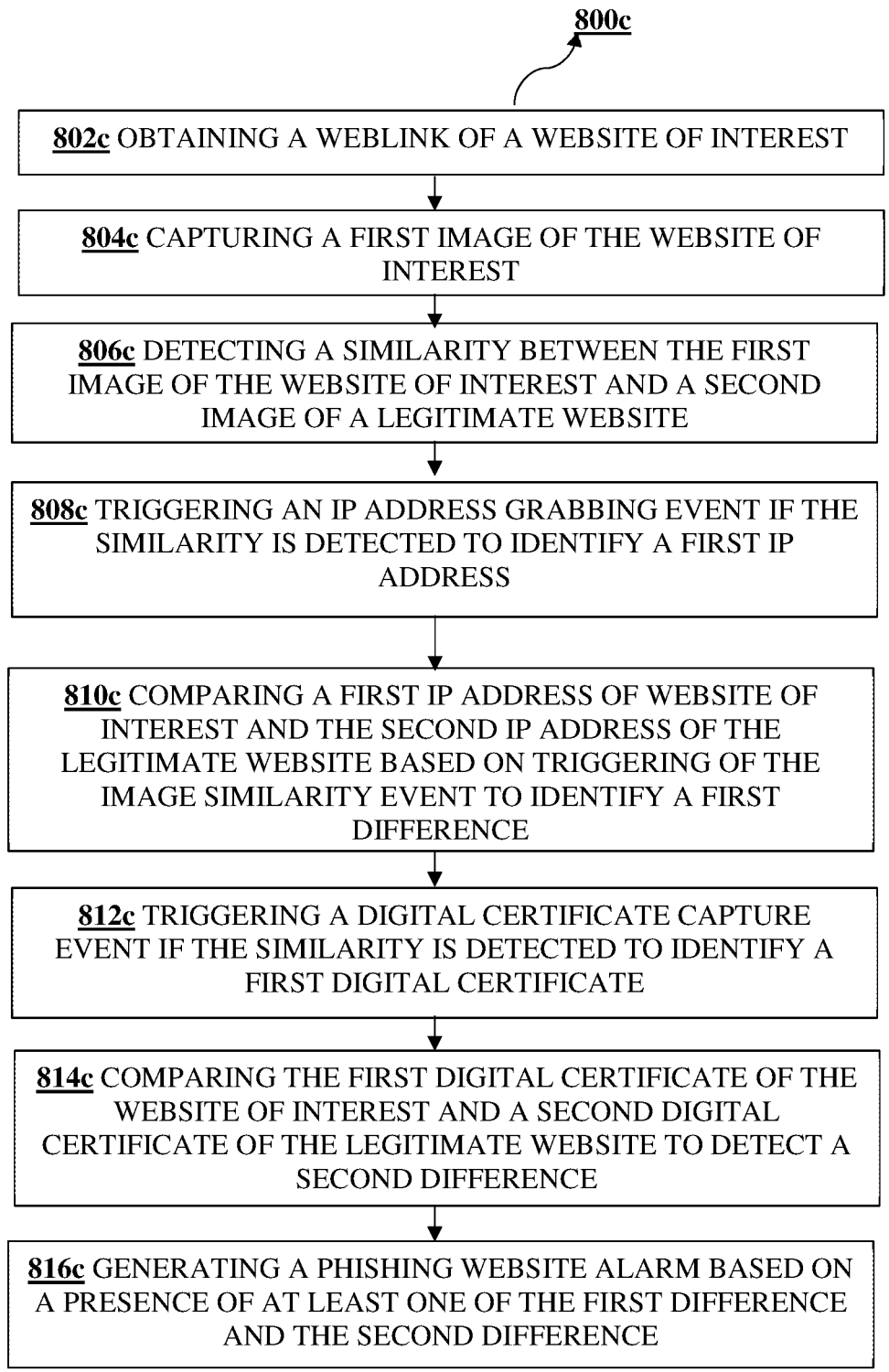
Referring to FIG. 8C, it shows a third method for phishing website detection, according to one or more embodiments.

Referring to FIG. 8C, it shows a method for phishing website detection according to one or more embodiments. The method 800c utilizes image similarity, IP differences, and digital certificate differences between the phishing website and the legitimate website to detect phishing and generate an alarm if the application suspects phishing. Step 802c of the method 800c comprises obtaining a weblink of a website of interest. Step 804c of the method 800c comprises capturing a first image of the website of interest. Step 806c of the method 800c comprises detecting a similarity between the first image of the website of interest and a second image of a legitimate website. Step 808c of the method 800c comprises triggering an IP address grabbing event if the similarity is detected to identify a first IP address. Step 810c of the method 800c comprises comparing the first IP address of the website of interest with a second IP address of the legitimate website based on triggering of the image similarity event to identify a first difference. Step 812c of the method 800c comprises triggering a digital capture event if the similarity is detected to identify a first digital certificate. Step 814c of the method 800c comprises comparing the first digital certificate of the website of interest and a second digital certificate of the legitimate website to detect a second difference. Step 816c of the method 800c comprises generating a phishing website alarm based on a presence of at least one of the first difference and the second difference.

Figure 9:
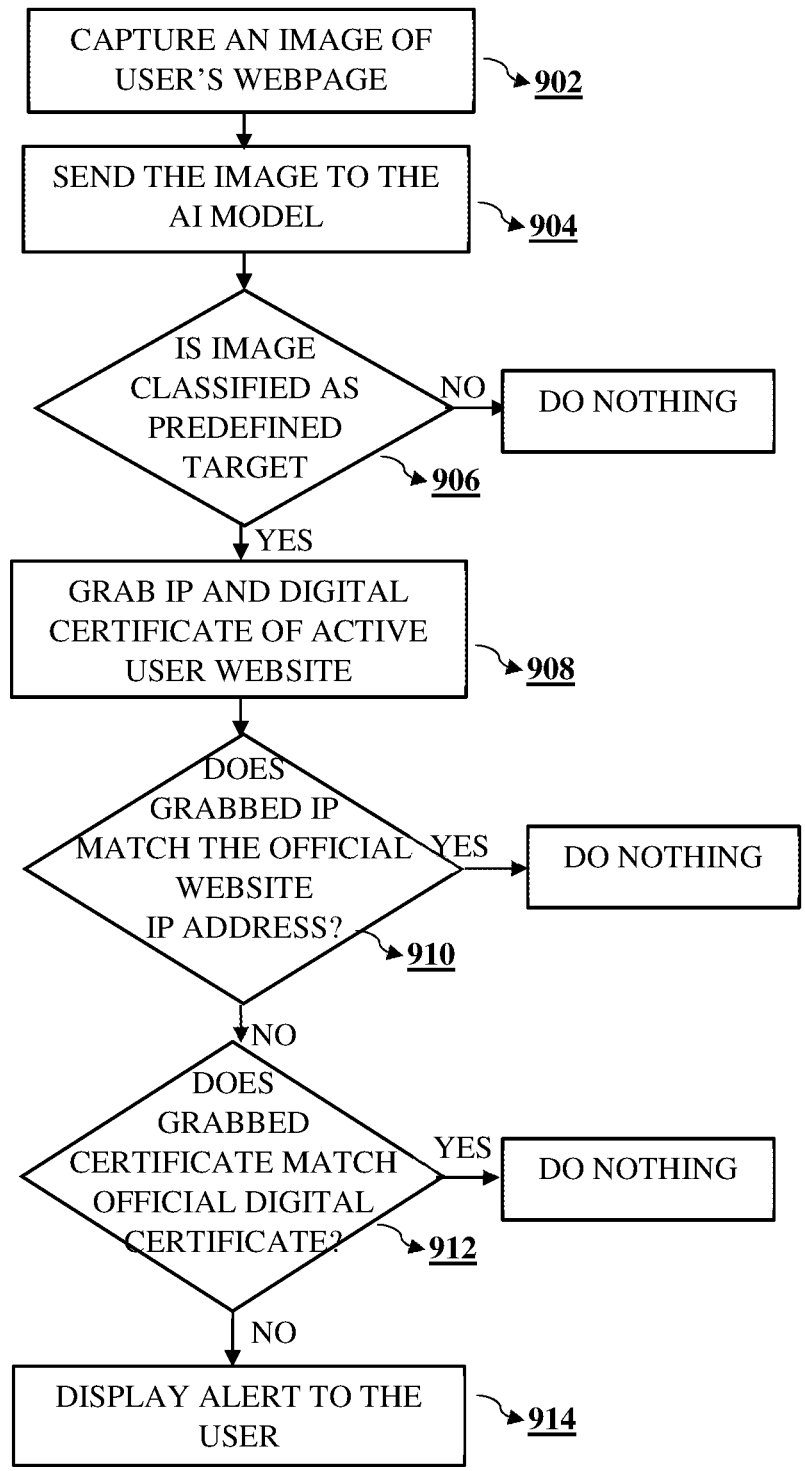
FIG. 9 is a block chart illustrating application workflow, according to one or more embodiments.

Referring to FIG. 9, it shows a block chart illustrating application workflow, according to one or more embodiments. The application, in step 902, captures an image of the user's webpage. In step 904, the application sends the image to the AI model. In step 906, the application checks if the image is classified as a predefined target. If the image is not classified as a predefined target, the application does nothing. If the image is classified as a predefined target, the application, in step 908, grabs the IP address and digital certificate of the active user website. In step 910, the application compares the grabbed IP address with the official website IP address. If the IP address matches, the application does nothing. If the IP address does not match, in step 912, the application compares the grabbed digital certificate with the official digital certificate. If the digital certificate matches the application does nothing. If the digital certificate does not match, in step 914, the application displays an alert to the user.

Figure 10:
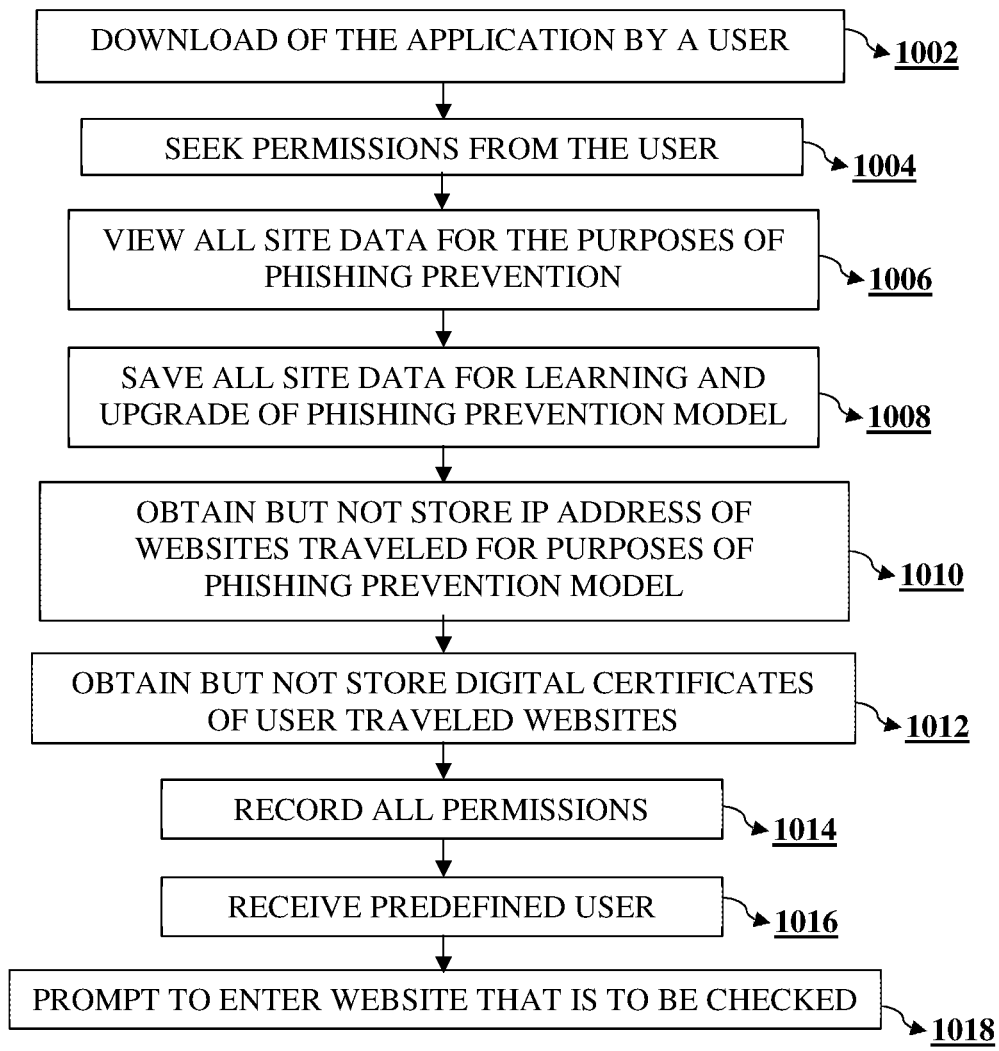
FIG. 10 is a block chart illustrating users onboard the system, according to one or more embodiments.

Referring to FIG. 10, it shows a block chart illustrating users onboard the system, according to one or more embodiments. This block chart describes different information a user is required to provide when the user first implements this application. This process will run only once. In step 1002, the user downloads the application on the user's system. In step 1004, the application seeks permissions from the user to run programs. In step 1006, the application views all site data for the purpose of phishing prevention. In step 1008, the application uses all the site data for learning and upgrading of phishing prevention models. In step 1010, the application obtains but does not store IP addresses of websites traveled for purposes of phishing prevention model. In step 1012, the application obtains but does not store digital certificates of user-traveled websites. In step 1014, the application records all the permissions. In step 1016, the application receives predefined user websites of the websites traveled. In step 1018, the application prompts to enter a website that is to be checked.

An embodiment relates to a method for automatic phishing website detection. The method comprising obtaining a weblink of a website of interest, capturing a first image of the website of interest, detecting similarity percentage between the first image of the website of interest and a list of pre-configured legitimate websites corresponding to a label in a database, detecting a difference between the first image of the website of interest and a second image of legitimate websites when the similarity percentage is above a predefined threshold, and generating a phishing website alarm based on a presence of the difference.

In an embodiment, the predefined threshold is in a range of 85% to 99.9%.

In another embodiment, the predefined threshold is in a range of 90% to 99.9%.

In yet another embodiment, the predefined threshold is in a range of 95% to 99.9%.

In yet another embodiment, the predefined threshold is in a range of 98% to 99.9%.

In yet another embodiment, the predefined threshold is in a range of 99% to 99.9%.

INCORPORATION BY REFERENCE

All references, including granted patents and patent application publications, referred herein are incorporated herein by reference in their entirety.

U.S. Ser. No. 11/381,597B2 patent titled "Expedition of web phishing detection for suspicious sites";

US20220385694A1 patent application titled "Method and device for clustering phishing web resources based on visual content image";

U.S. Ser. No. 11/595,438B2 patent titled "Webpage Phishing Detection Using Deep Reinforcement Learning";

U.S. Ser. No. 11/582,226B2 patent titled "Malicious Website Discovery Using Legitimate Third Party Identifiers";

U.S. Ser. No. 11/570,211B1 patent titled "Detection Of Phishing Attacks Using Similarity Analysis";

U.S. Ser. No. 11/444,978B1 patent titled "Machine Learning-based System For Detecting Phishing Websites Using The URLS, Word Encodings And Images Of Content Pages";

What is claimed is:

1. A system comprising:
a processor; and a non-transitory memory comprising instructions that when executed by the processor, performs:
obtaining a weblink of a website of interest;
capturing a first image of the website of interest by rendering and screenshotting the website of interest;
detecting, using a machine learning model, a similarity between the first image of the website of interest and a second image of legitimate websites corresponding to a label in a database;
grabbing a first IP address of the website of interest if the similarity is detected;
comparing the first IP address of the website of interest with a database of legitimate IP addresses in at least one of a static context and a dynamic context to identify a difference; and
generating a phishing website alarm based on a presence of the difference,
wherein the machine learning model is trained using a first dataset in an image database; wherein the first dataset is expanded to a third dataset by adding a second dataset to the first dataset, the second dataset is obtained by performing augmentation and creating variations to the first dataset; and
wherein the machine learning model is retrained using the third dataset in the image database.

2. The system of claim 1, further comprises sending information comprising the first image and the first IP address about a known phishing website to at least one of a domain owner and a repository on an as-needed basis.

3. The system of claim 2, further comprises storing details and information related to the known phishing websites and the legitimate websites from a public database.

4. The system of claim 1, further comprises collecting a list of legitimate URLs corresponding to the legitimate websites.

5. The system of claim 1, further comprises prompting a command to enter the weblink of the website of interest.

6. The system of claim 1, wherein the processor captures the first image of the website of interest using a web crawler.

7. The system of claim 1, wherein the processor detects the similarity between the first image of the website of interest and the legitimate websites using computer vision.

8. The system of claim 1, wherein the system is further configured to:
retrieve a first digital certificate of the website of interest; and
compare the first digital certificate of the website of interest with a digital certificate of the legitimate websites that the first image was classified into to identify a second difference.

9. A method comprising:
obtaining a weblink of a website of interest;
retrieving a first image of the website of interest by rendering and screenshotting the website of interest;
detecting a similarity, using a machine learning model, between the first image of the website of interest and a second image of a legitimate website;
grabbing a first IP address of the website of interest if the similarity is detected;
comparing the first IP address of website of interest with a second IP address of the legitimate website to detect a difference; and generating a phishing website alarm based on a presence of the difference;
training the machine learning model using a first dataset in an image database;
expanding the first dataset to a third dataset by adding a second dataset to the first dataset, wherein the second dataset is obtained by performing augmentation and creating variations to the first dataset; and
retraining the machine learning model using the third dataset in the image database.

10. The method of claim 9, wherein retrieving the first image of the website can be done using at least one of network scanning, and capturing a Document Object Model (DOM) of the website of interest utilizing a web scraper and creating an image with the captured Document Object model.

11. The method of claim 9, wherein comparing the first IP address with the second IP address is done using at least one of an exact match algorithm, subnet match algorithm, geo-location match algorithm and behavior-based match algorithm.

12. The method of claim 9, further comprises maintaining and updating the image database comprising a series of first images, second images and augmented images and associated labels of the website of interest.

13. The method of claim 12, wherein the image database is used to update the machine learning model on similarity for images of the website of interest.

14. The method of claim 13, further comprises periodically training the machine learning model with the image database that is maintained through automated software features.

15. The method of claim 13, wherein the machine learning model is utilized in a workflow of an application.

16. The method of claim 15, wherein the application resides on a browser as an add-on extension.

17. The method of claim 15, further comprises:
retrieving a first digital certificate of the website of interest; and
comparing the first digital certificate of the website of interest with a digital certificate of the legitimate website that the first image was classified into, to identify a second difference.

18. A non-transitory computer-readable storage medium, storing executable instructions, when executed by a processor, causing the processor to implement a machine learning (ML)-based phishing protection method, the method comprising:
obtaining a weblink of a website of interest;
capturing a first image of the website of interest by rendering and screenshotting the website of interest;

detecting a similarity, using a machine learning model, between the first image of the website of interest and a second image of a legitimate website;
grabbing a first IP address of the website of interest if the similarity is detected;
comparing the first IP address of the website of interest with a second IP address of the legitimate website to detect a difference;
generating a phishing website alarm based on a presence of the difference;
training the machine learning model using a first dataset in an image database;
expanding the first dataset to a third dataset by adding a second dataset to the first dataset, wherein the second dataset is obtained by performing augmentation and creating variations to the first dataset; and
retraining the machine learning model using the third dataset in the image database.

* * * * *